(12) United States Patent
Chen et al.

(10) Patent No.: US 9,706,237 B2
(45) Date of Patent: Jul. 11, 2017

(54) TV PLAYLIST

(71) Applicant: Time Warner Cable Enterprises LLC, New York, NY (US)

(72) Inventors: David Chen, Jamison, PA (US); Vipul Patel, Upper Holland, PA (US); Jian Yu, Warrington, PA (US); John Chen, Ashburn, VA (US); Marc Lawrence-Apfelbaum, New York, NY (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 13/798,070

(22) Filed: Mar. 12, 2013

(65) Prior Publication Data
US 2014/0282772 A1    Sep. 18, 2014

(51) Int. Cl.
*H04N 21/45* (2011.01)
*H04N 21/262* (2011.01)
*H04N 21/422* (2011.01)
*H04N 21/458* (2011.01)
*H04N 21/466* (2011.01)
*H04N 21/482* (2011.01)

(52) U.S. Cl.
CPC . *H04N 21/26258* (2013.01); *H04N 21/42201* (2013.01); *H04N 21/4586* (2013.01); *H04N 21/466* (2013.01); *H04N 21/4825* (2013.01); *H04N 21/4828* (2013.01)

(58) Field of Classification Search
None
See application file for complete search history.

(56) References Cited

U.S. PATENT DOCUMENTS

| 7,624,416 B1* | 11/2009 | Vandermolen et al. ...... 725/109 |
| 8,234,679 B2 | 7/2012 | Lawrence-Apfelbaum |
| 2003/0056217 A1 | 3/2003 | Brooks |
| 2003/0093790 A1* | 5/2003 | Logan ............... G06F 17/30265 725/38 |
| 2005/0278761 A1* | 12/2005 | Gonder ............. H04L 29/06027 725/95 |
| 2008/0022012 A1* | 1/2008 | Wang ............................ 709/238 |
| 2008/0065989 A1 | 3/2008 | Conroy |
| 2009/0150941 A1* | 6/2009 | Riedl ..................... H04N 7/173 725/61 |
| 2010/0324704 A1 | 12/2010 | Murphy |

(Continued)

OTHER PUBLICATIONS

"NeuroSky Store—Developer Tools 3: IOS" downloaded from http://store.neurosky.com/products/developer-tools-3-iphone on Mar. 5, 2013.

(Continued)

*Primary Examiner* — Cai Chen
(74) *Attorney, Agent, or Firm* — Otterstedt, Ellenbogen & Kammer, LLP

(57) ABSTRACT

A playlist server application is provided on a server at a first network node. A playlist local application is provided for a remote device. An indication of a change to a playlist on one of the server and the remote device is obtained from a corresponding one of the playlist server application and the playlist local application. The change is synchronized to another one of the server and the remote device.

16 Claims, 13 Drawing Sheets

(56) References Cited

U.S. PATENT DOCUMENTS

| | | |
|---|---|---|
| 2011/0087665 A1 | 4/2011 | Weare |
| 2012/0054808 A1* | 3/2012 | Nijim .......................... 725/88 |
| 2012/0057853 A1 | 3/2012 | Huber |
| 2012/0060195 A1 | 3/2012 | Fishman |
| 2014/0068688 A1 | 3/2014 | Sarosi |

OTHER PUBLICATIONS

"NeuroSky Store—Developer Tools 3: Android" downloaded from http://store.neurosky.com/products/developer-tools-3-android on Mar. 5, 2013.

"NeuroSky Store—Developer Tools 2.1" downloaded from http://store.neurosky.com/products/developer-tools-2-1 on Mar. 5, 2013.

"Brain Wave Signal (EEG) of NeuroSky, Inc." Dec. 15, 2009, NeuroSky, Inc.

"OpenCable™ Specifications, ETV, Enhanced TV Binary Interchange Format, OC-SP-ETV-BIF1.0.1-120614". Cable Television Laboratories, Inc. Jun. 14, 2012.

"EIDR—A universal unique identifier for movie and television assets". downloaded from http://eidr.org/ on Feb. 22, 2013.

"Mico headphones scan brainwaves to match songs to your mood" downloaded from http://www.gizmag.com/neurowear-mico-headphones/26627/ on Mar. 20, 2013.

* cited by examiner

```
tv://channelNumber:startTime,
vod://providerId/assetId,
http://www.timewarnercable.com/movie1.mp4,
dvr://recordId,
ndvr//recordId,
file://playlist/movie1.mp4.

startTime can be a UTC time, or in DD:HH:MM
(DD: day of week, ranges 0-7; 0 means every day; 1 means every Monday etc.)
```

FIG. 12

```
[protocol]://[address]/[path]/[identifier]?[params]
```

FIG. 13

```
tv://channelNumber
vod://providerId/assetId
http://contentprovidersite.com/content.mpg
and the like
```

TV PLAYLIST

FIELD OF THE INVENTION

The present invention relates generally to content networks and other communications networks, and, more particularly, to techniques for preparing and updating a playlist of content to be consumed, and the like.

BACKGROUND OF THE INVENTION

In the realm of music storage and playback using personal computers (PCs), the term "playlist" was adopted by various media player software programs intended to organize and control music on a PC. Such music playlists may be defined, stored, and selected to run either in sequence or, if a random playlist function is selected, in a random order.

On video hosting service websites, users can make playlists of selected videos from themselves or other users.

US Patent Application Publication 2005-0278761 of Thomas L. Gonder et al. discloses playlist menu navigation, wherein a method of operating a communications system includes receiving a request for establishment of a session from a terminal, establishing the session with the terminal, and providing at least one navigation video segment to the terminal, via the session. The communications system may be a source of programming, such as a cable system, and the terminal may be a set-top terminal coupled to a display device. The navigation video segment may be used by the terminal to create selection menus to be displayed for user navigation. The video segments may be rich media video segments. A playlist may be generated comprising an indexed listing of a plurality of available video segments. The playlist may facilitate retrieval of video segments requested by a terminal.

US Patent Application Publication 2009-0150941 of Steven Riedl et al. discloses an apparatus and method for video-on-demand playlist, wherein a method of providing programming content from a video server to a client coupled to the video server by a video content network includes the steps of sending, to the client, a playlist describing an interrelationship between at least one program segment and at least one related segment; sending, from the video server to the client over the video content network, video content comprising the at least one program segment and the at least one related segment; and modifying the playlist via communication to the client. The steps of sending the playlist, sending the content, and modifying the playlist are all accomplished within a single video-on-demand session per user.

SUMMARY OF THE INVENTION

Principles of the present invention provide techniques for a TV play list. In one aspect, an exemplary method includes the steps of providing a playlist server application on a playlist at a first network node; providing a playlist local application for a remote device; obtaining an indication of a change to a playlist on one of the server and the remote device from a corresponding one of the playlist server application and the playlist local application; and synchronizing the change to another one of the server and the remote device.

In another aspect, another exemplary method includes providing a playlist server application on a server at a first network node; and constructing a playlist via the playlist server application. The playlist in turn includes at least one content item from each of a multi-service operator system; and a location outside the multi-service operator system.

In still another aspect, an exemplary server for interfacing with a remote device includes at least one hardware processor; at least one memory coupled to the at least one processor; and a playlist server application software module, embodied on a non-transitory tangible computer-readable recordable storage medium. The playlist server application software module, when loaded into the memory, causes the at least one hardware processor to: obtain an indication of a change to a playlist on one of the server and the remote device; and synchronize the change to another one of the server and the remote device.

In an even further aspect, an exemplary apparatus includes at least one hardware processor; at least one memory coupled to the at least one processor; and a playlist application software module, embodied on a non-transitory tangible computer-readable recordable storage medium. The playlist application software module, when loaded into the memory, causes the at least one hardware processor to construct a playlist which includes at least one content item from each of: a multi-service operator system; and a location outside the multi-service operator system.

In still a further aspect, a remote device for interfacing with a server includes at least one hardware processor; at least one memory coupled to the at least one hardware processor; and a playlist local application software module, embodied on a non-transitory tangible computer-readable recordable storage medium. The playlist local application software module, when loaded into the memory, causes the at least one hardware processor to: obtain an indication of a change to a playlist on one of the server and the remote device; and synchronize the change to another one of the server and the remote device.

In yet a further aspect, an exemplary method includes the steps of obtaining, at a computing device, input from a brainwave sensor indicative of brainwaves of a user; and, based at least in part on the input from the brainwave sensor, carrying out, by a processor of the device executing an application program, at least one of: (1) recommendation of a currently playing item, which has, at least in part, influenced the brainwaves, for inclusion in a first playlist; and (2) recommendation of a second playlist to at least one of complement and alter a mental state of the user, the mental state of the user being associated with the brainwaves of the user. A further step includes respectively adding the currently playing item to the first playlist or playing the second playlist in accordance with the carrying out step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated.

Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide a playlist which facilitates synchronization across multiple devices and/or which collects content from diverse content sources.

These and other features and advantages of the present invention will become apparent from the following detailed description of illustrative embodiments thereof, which is to be read in connection with the accompanying drawings.

BRIEF DESCRIPTION OF THE DRAWINGS

FIG. 12 shows examples of a URL associated with a content item, in accordance with an aspect of the invention;

FIG. 13 shows exemplary syntax for a URL for content, in accordance with an aspect of the invention;

FIG. 14 shows exemplary item sources in URL format, in accordance with an aspect of the invention.

DETAILED DESCRIPTION OF PREFERRED EMBODIMENTS

Embodiments of the invention may be implemented in a variety of contexts, to assemble playlists with content from many different sources. Purely by way of example and not limitation, some embodiments are used in connection with a radio frequency (RF) content network such as a cable or hybrid fiber-cable (HFC) system operated by a cable multi-service operator (MSO) or the like.

Figure 1:
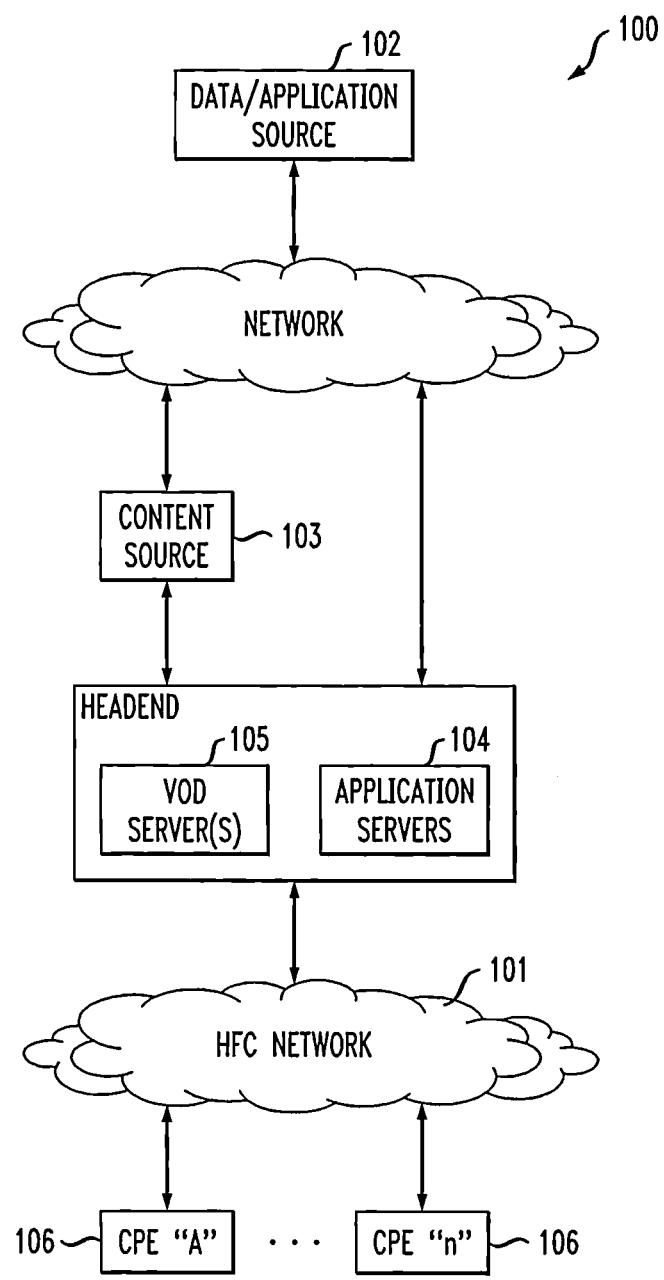
FIG. 1 is a functional block diagram illustrating an exemplary hybrid fiber-coaxial (HFC) network configuration useful with one or more embodiments of the present invention.

FIG. 1 illustrates a typical content-based network configuration 100 with which some embodiments of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. The distribution server(s) 104, VOD servers 105 and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 2 (described in greater detail below) may be used.

It should be noted at this point that in addition to a conventional HFC network or a switched digital network to be discussed below, other kinds of video content networks can be employed for network 101 (e.g., satellite network, fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104.

The network interconnecting elements 102, 103, and the head end is not separately numbered.

Figure 2:
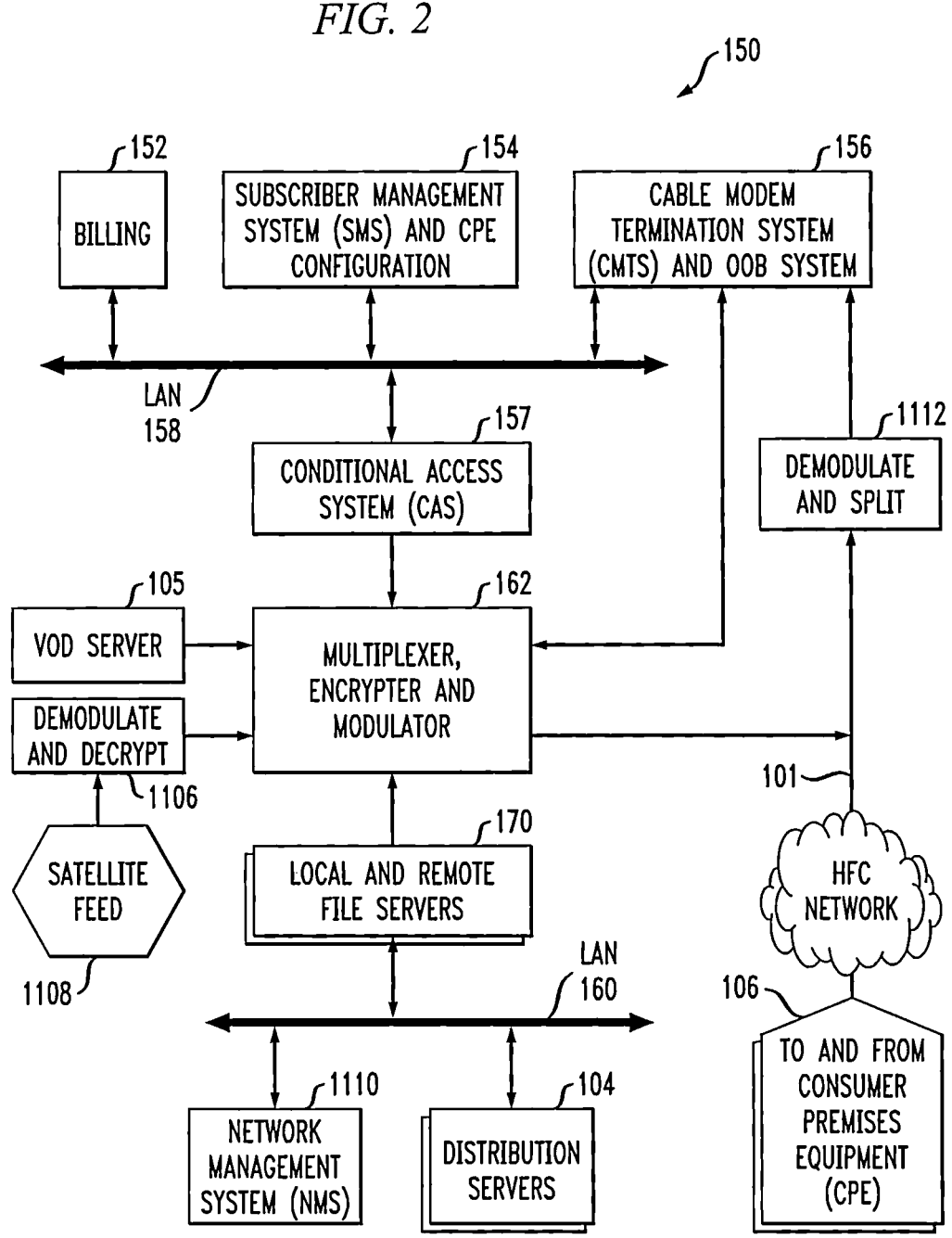
FIG. 2 is a functional block diagram illustrating one exemplary HFC cable network head-end configuration useful with one or more embodiments of the present invention.

Referring now to FIG. 2, one exemplary embodiment of a head-end architecture useful with the present invention is described. As shown in FIG. 2, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 2 is high-level, conceptual architecture and that each multi-service operator or multiple system operator (MSO) may have multiple head-ends deployed using custom architectures.

The architecture 150 of FIG. 2 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 3) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience. The DOCSIS specifications versions 1.0, 1.1, 2.0, and 3.0 are all expressly incorporated herein by reference in their entireties for all purposes. The OpenCable™ Application Platform (OCAP) 1.1.3, 1.1.5, 1.2, 1.2.1, 1.2.2, and 1.2.3 (and subsequent) specification (Cable Television laboratories Inc.) provides for exemplary networking protocols both downstream and upstream, although the invention is in no way limited to these approaches. The DOCSIS Set-top Gateway (DSG) Interface Specification, CM-SP-DSG-119-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes. Furthermore, the DAVIC 1.0 through 1.5 specifications, inclusive, available from DAVIC, the Digital Audio Video Council, are also expressly incorporated herein by reference in their entireties for all purposes. Yet further, the MoCA 1.0, 1.1, and 2.0 specifications, inclusive, available from the Multimedia over Coax Alliance (MoCA), are also expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 3:
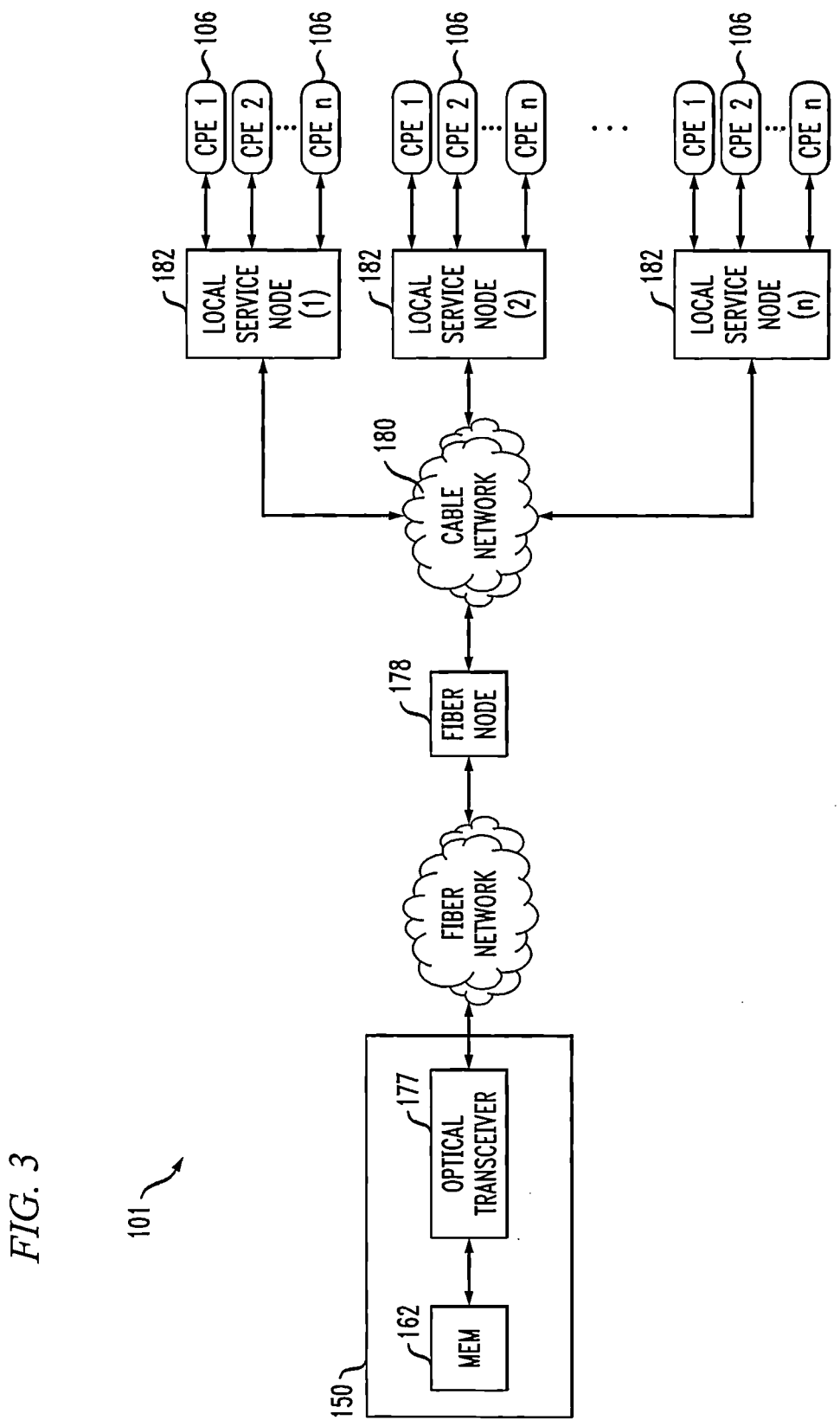
FIG. 3 is a functional block diagram illustrating one exemplary local service node configuration useful with one or more embodiments of the present invention.

As shown in FIG. 3, the network 101 of FIGS. 1 and 2 comprises a fiber/coax arrangement wherein the output of the MEM 162 of FIG. 2 is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 4:
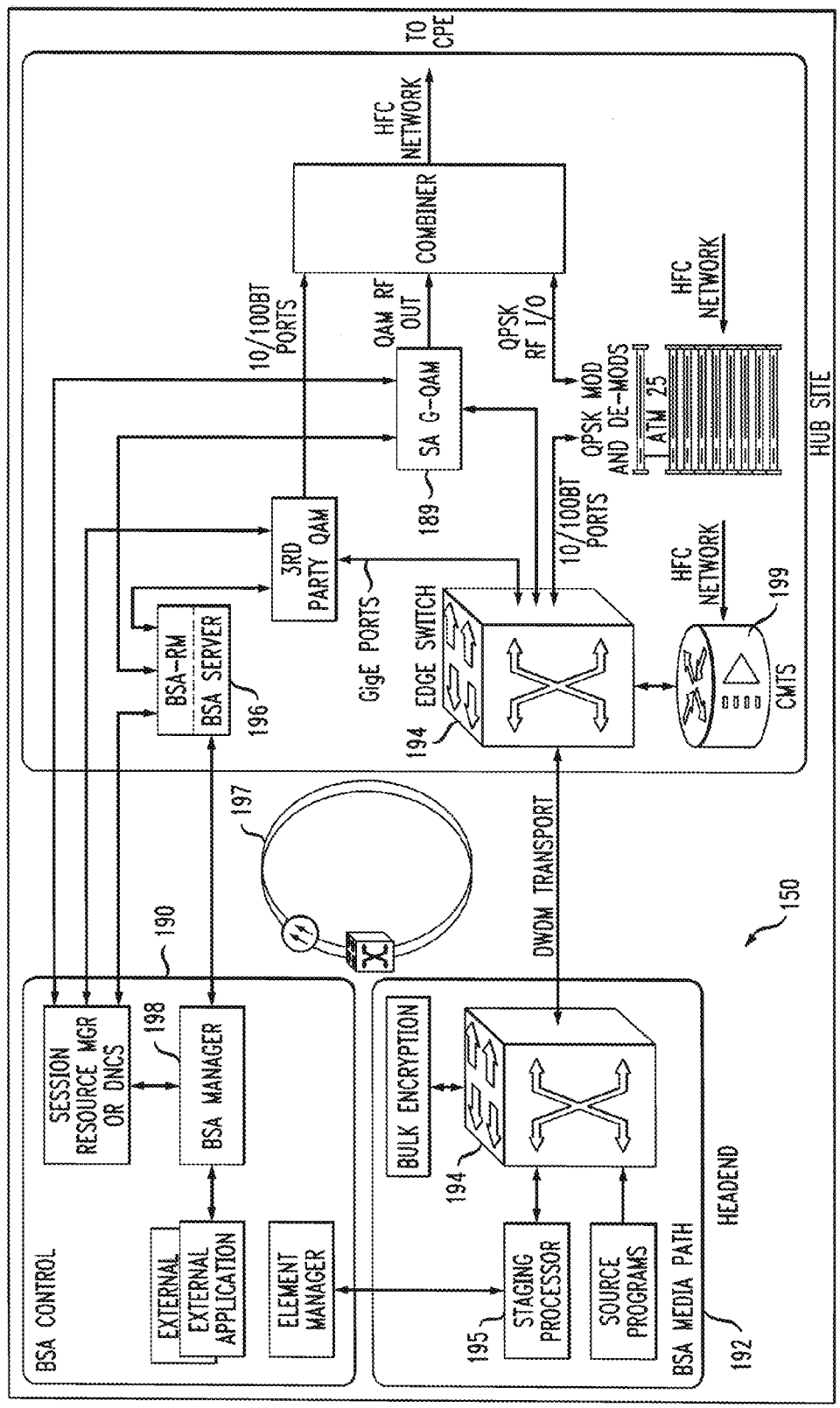
FIG. 4 is a functional block diagram illustrating one exemplary broadcast switched architecture (BSA) network useful with one or more embodiments of the present invention.

FIG. 4 illustrates an exemplary "switched" network architecture also useful with some embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 4 shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with some embodiments of the present invention, although it will be recognized by those of ordinary skill that other approaches and architectures may be substituted.

In addition to "broadcast" content (e.g., video programming), the systems of FIGS. 1-4 may also deliver Internet data services using the Internet Protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 4, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 4 can, in the most general case, be the same or different as that shown in the hub site of FIG. 4. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some examples presented herein are described in the context of Internet services that include multicast and unicast data, other examples could involve other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-4 are exemplary in nature and different approaches may be used in other embodiments; such other approaches may have more or less functionality (for example, high speed Internet data services might be omitted from some networks in some cases) or high speed Internet data services might be provided by an entity other than an MSO.

A playlist is a list of content items chosen to run in sequence or randomly. The content items can be of any type and from one or more sources, such as live content items (e.g. live broadcasts) over radio frequency (RF) or Internet Protocol (IP), programs recorded locally on a digital video recorder (DVR), programs programmed on a network DVR (wherein material is stored in a network node remote from the television), programs from a video-on-demand (VOD) library, or programs from an online content library/stores on a private network or a public network, such as the Internet. The content items in a playlist can be chosen to represent a particular theme, interest or a variety of interests (e.g., comedy and drama). Content items chosen for a playlist can be influenced or selected by service providers', critics, friends' recommendations, genres such as "kids," or from usage/consumption data such as "most watched." A playlist can be associated with a household and shared among the viewers in a household, can be personalized for a specific user, or shared with a third party by sending the playlist to, for example, a friend.

Figure 5:
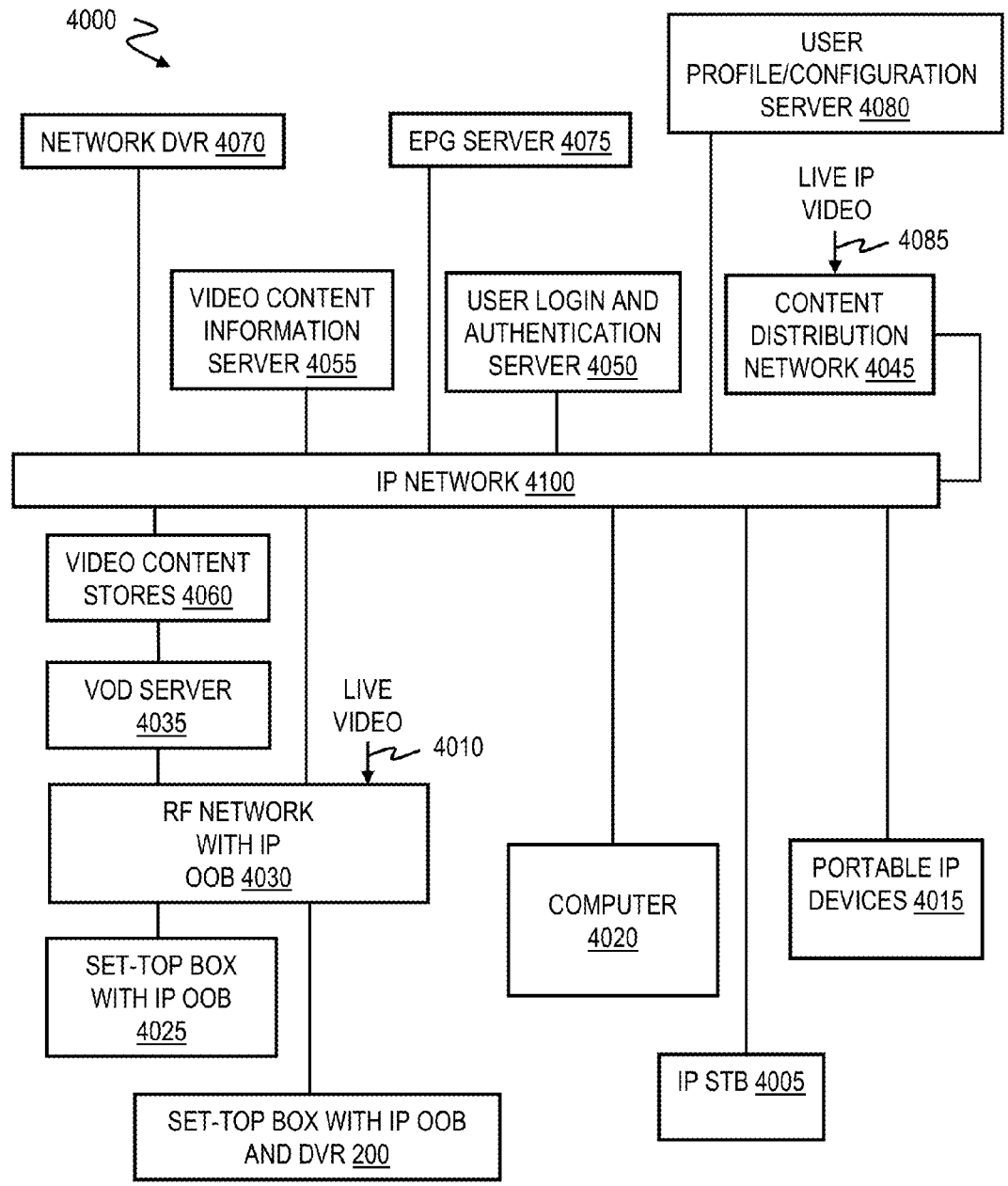
FIG. 5 is an overall system block diagram depicting an embodiment of the invention.

FIG. 5 is an overall system block diagram 4000 depicting an embodiment of the invention. The various components include one or more network DVRs 4070; one or more electronic program guide (EPG) servers 4075; one or more user profile/configuration servers 4080; one or more video content stores 4060; one or more video content information servers 4055; one or more user login and authentication servers 4050; a content distribution network 4045; one or more video-on-demand (VOD) servers 4035; an IP network 4100; one or more live IP video sources 4085; one or more live video sources 4010; and an RF network (with IP data communication available out-of-band (OOB)) 4030. Also included are one or more user portable IP devices 4015 (e.g., "smart" phone, tablet, laptop); one or more computers 4020 (e.g. desktop or tower); set-top terminal (with IP data communication available OOB) 4025; set-top terminal (with IP OOB and a local DVR) 200; and one or more IP-based set-top terminals 4005.

In one or more embodiments, elements 4005, 4015, 4020 can access material from both MSO and non-MSO sources.

Playlists can be created, changed and played on various types of devices. Non-limiting examples of such devices include computer 4020, set-top terminal 4025, set-top terminal 200, IP set-top terminal 4005, and portable device 4015 (e.g., tablet, smart phone, laptop, through a web portal). In some instances, playlists can be viewed and modified on devices; in other instances, some devices can modify playlists but may not be able to consume the content. In one or more embodiments, the playlist is persisted on the server side and the local app synchronizes with the server data. In some cases, loading the URL from the browser involves fetching the application from the cloud and running it locally within a user agent on the device.

Figure 6:
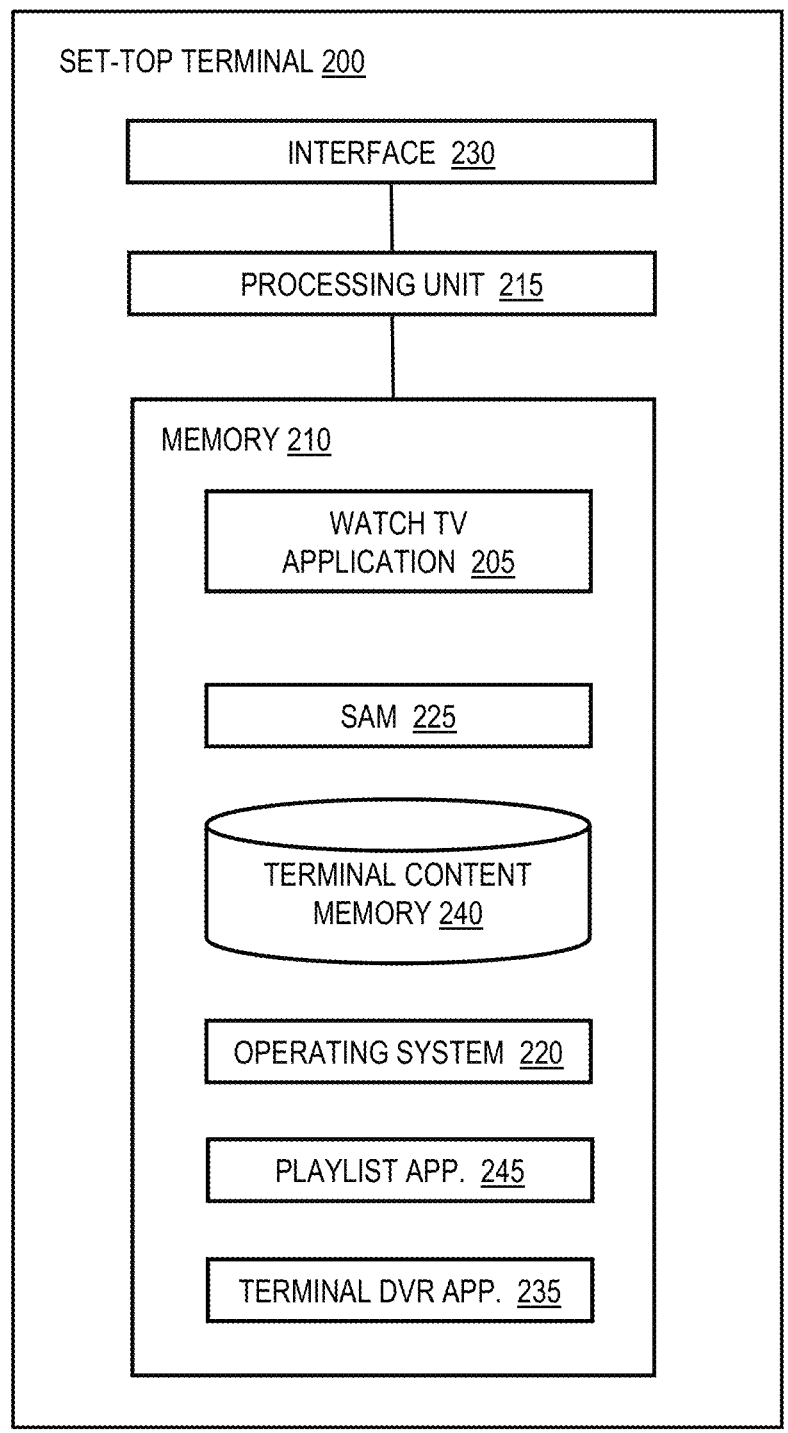
FIG. 6 is a functional block diagram of an exemplary set-top terminal, in accordance with an aspect of the invention.

Referring to FIG. 6, in accordance with aspects of the invention, a playlist application 245 is installed in set-top terminal 200 enabling a user to create, edit and play one or more playlists. It should be realized that playlist application 245 can be installed in one or more of the devices 200, 4005, 4015, 4020, or 4025 mentioned just above, and that master playlist may reside in the cloud; e.g., on server 4080. However, in this example, set-top terminal 200 with a DVR is selected for illustrative purposes. FIG. 6 shows a block diagram with some elements of an exemplary set-top terminal 200, which is one form of CPE. Playlist application 245 is stored in memory 210 and provides instructions to a processing unit 215, and hence set-top terminal 200, to create, edit and play one or more playlists, which is discussed later in detail. Also included in set-top terminal 200 is a conventional "Watch TV" application 205, which is installed in the set-top terminal 200 to service those program channels (or programs) afforded the traditional broadcast service. The Watch TV application 205, residing in memory 210, provides such well-known functions as channel navigation control, channel selection in response to a channel change event, etc. A channel change event occurs when a user at the set-top terminal 200 issues a command to change from one program channel to another. Such a command may be issued, say, using a remote control (not shown), which signal is receptive by the set-top terminal 200. The memory 210 in this instance includes one or more caches, disks, hard drives, non-volatile random access memories (NVRAMs), dynamic random access memories (DRAMs), read-only memories (ROMs), and/or Flash ROMs, or the like.

For example, in memory 210, NVRAM may be used for storage of a user's settings and set-top terminal configuration settings, such as parental control codes, favorite channel lineups, set-top terminal setups, channel maps, authorization tables, and forward data channel (FDC) address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to the set-top terminal 200 from the head end 150 and/or user profile/configuration server 4080, for example, after set-top terminal 200 or other CPE has been deployed at the user's premises. In general, NVRAM is used to store transient data on CPE devices while the ROM is used for storage of the operating system (OS) and application code modules.

Processing unit 215 executes instructions for the operation of set-top terminal 200. The instructions are stored in the memory 210 under the control of an operating system 220. A service application manager (SAM) application 225 is also stored in memory 210 and may form part of the operating system 220. The SAM application 225 is responsible for, among other things, monitoring channel change events; administering channel, service and other tables in the set-top terminal 200; and maintaining a registry of applications in the set-top terminal 200. One such application is the aforementioned Watch TV application 205, which is invoked to service a traditional broadcast channel (or program). An interface 230 allows receipt of in-band and out-of-brand material from the head end 150, as well as sending communications to the head end 150 via a reverse data channel (various kinds of forward and reverse data channels are known to the skilled artisan), via network 101 or the like.

Interface 230 may include an RF front end (including demodulator and decryption unit) for interface with a network, such as network 101 or the like, as well as a plurality of different types of interfaces (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the set-top terminal 200 include RF tuner stages, buffer memory (which may be implemented in RAM or otherwise), various processing layers (e.g., DOCSIS MAC or DAVIC OOB channel, MPEG, etc.) as well as media processors and other specialized system-on-chip (SoC) or application-specific integrated circuit (ASIC) devices. These additional components and functionality are, in and of themselves, well known to those of ordinary skill in the cable and embedded system fields, and accordingly are not described further herein.

The set-top terminal 200 may also be provided with an OCAP-compliant monitor application and Java-based middleware which, inter alia, manages the operation of the set-top terminal 200 and applications running thereon. It will be recognized by those of ordinary skill that myriad different device and software architectures may be used consistent with the invention.

Exemplary set-top terminal 200 also provides digital video recorder (DVR) functionality. To this end, memory 210 further includes a terminal DVR application 235 and a terminal content memory 240 (e.g., one or more hard drives) for storing content locally on the set-top terminal 200. While, in the embodiment shown in FIG. 2, set-top terminal 200 provides DVR functionality, in other instances, separate set-top terminals are associated with separate DVRs.

Figure 7:
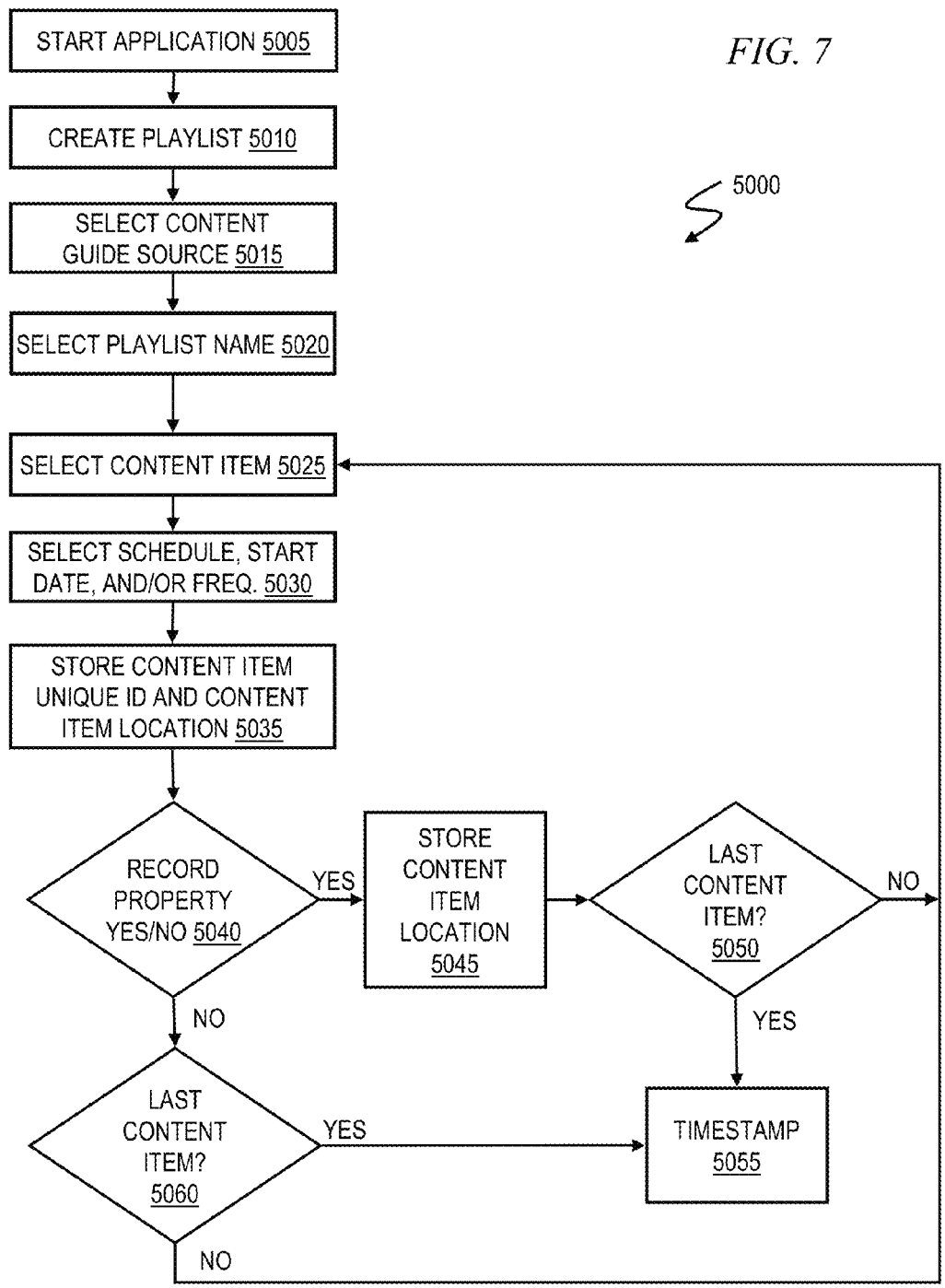
FIG. 7 is a flow chart of exemplary method steps for creating a playlist, in accordance with an aspect of the invention.

FIG. 7 shows a high level diagram 5000 of a process for creating a playlist in accordance with an illustrative embodiment of the invention. To start, at step 5005, a user starts playlist application 245, which in this embodiment, is stored in memory 210 and executed by processing unit 215 in set-top terminal 200. The user may start playlist application 245 by actuating a front panel pushbutton on set-top terminal 200 or by operating a remote control in connection with set-top terminal 200. In another example, a user can launch application 245 by tuning to a virtual channel on a video receiver device, such as set-top terminal 200, through a dedicated key on remote controller/keyboard, or through an application icon or shortcut on a CPE display screen (e.g., TV connected to the set-top terminal).

After playlist application 245 is started, in some cases, the user is presented with a user interface on a display (e.g., TV) associated with set-top terminal 200. In this example, in some cases, playlist application 245 is configured to present the user with a main menu after the application is started.

Optionally, the user is prompted to log in to "login and authentication server" 4050 if not logged in yet, for playlist creation, edition, synchronization and content playing. Playlists saved on the "User profile/configuration server" 4080 are synchronized with the local playlist after user login. The user does not need to log in to the server for local playlist manipulation and in such a local mode, watches only contents that do not require signing in.

Depending on the configuration, the user will be brought to the application main menu screen (as noted above), or instead may be brought to a sub menu screen, or location where the user was before he or she last exited the application. Furthermore with regard to this "resume play" aspect, the application 245 in some instances will resume play from the point where user last exited the application.

Figure 11:
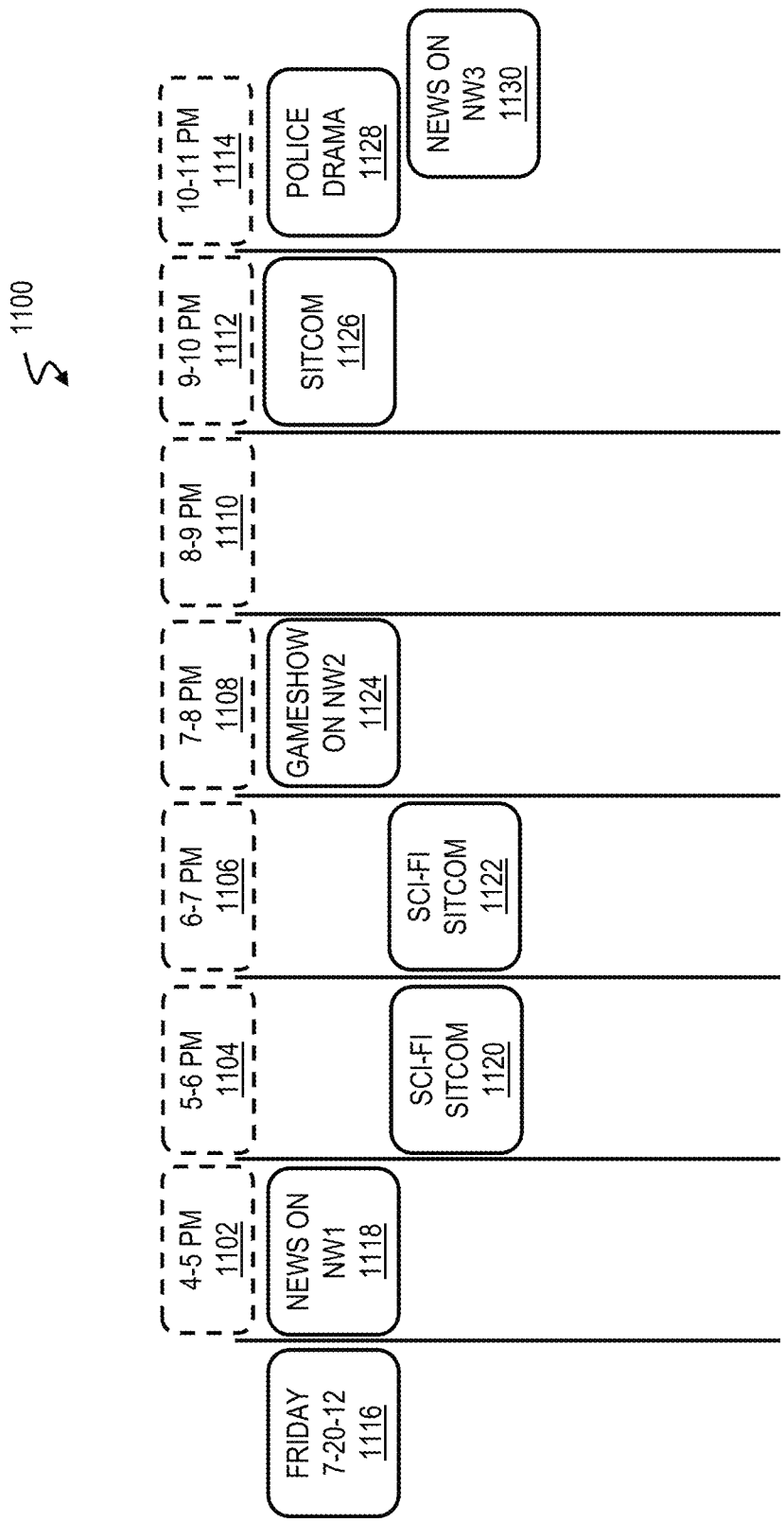
FIG. 11 is an exemplary graphical user interface timeline, in accordance with an aspect of the invention.

From the main menu the user may select different options, such as "create" a new playlist; "change" an existing playlist; "import" a playlist from other users' playlists or obtain "recommendations" for a playlist. A user can change an existing playlist, such as deleting, adding, or changing the order of, content items in a playlist. Other options in the main menu may include an option to "share" playlists with friends, "synchronize" a playlist to a master playlist on user profile/configuration server 4080, "play/start" or "record." It should be mentioned that the user interface can be configured in various ways. For example, playlist application 245 can be configured to provide a rich graphical user interface (GUI) with drag and drop capability to allow a user to create and change playlists, as shown in FIG. 11. The GUI 1100 can provide, for example, a timeline view of what is scheduled for a playlist and show alternate content items 1130 that can be played during unscheduled spots. Note that "generic" program names and fictitious network names are employed in FIG. 11 but actual names of networks and programs would typically be used. The GUI in question depicts a line-up for Friday Jul. 20, 2012, as seen at 1116. The time slots include 4-5 pm, as at 1102; 5-6 pm, as at 1104; 6-7 pm, as at 1106; 7-8 pm, as at 1108; 8-9 pm, as at 1110; 9-10 pm, as at 1112; and 10-11 pm, as at 1114. Scheduled items include News on NW1 1118, from 4-5 pm; Gameshow 1124 on NW2, from 7-8 pm; Sitcom 1126 from 9-10 pm; and Police Drama 1128 from 10-11 pm. In slots 1104 and 1106, SciFi Sitcom is available, as shown at 1120, 1122. Alternative show "News on NW3" 1130 is available in slot 1114.

In one or more embodiments, the content in the playlist can be uniquely identified by a uniform resource identifier (URI) that is based on a well-known, well-defined content ID scheme such as EIDR (Entertainment Identifier Registry) or CableLabs Asset Distribution Interface (ADI). The ID scheme can be based on an industry standard such as EIDR that allows unique identification of the content and/or program by other applications outside the service MSO, or it can be based on an ID scheme that is private to the MSO domain. Using a standards-based ID scheme allows the subscribers to share the play list with their friends and/or family and other social networks irrespective of their service provider. The content URI can be extended to form a URL which helps the application to locate the content and source.

In addition to a "create" submenu discussed just below, an "edit/view" submenu and/or a "synchronize" submenu can be provided. In the "Edit/View" submenu, the user can edit an existing playlist, delete, add, or change the order of items the playlist. Items to add can be selected from an electronic program guide (EPG), search results, recommendations and/or other playlists, and the like. Refer to the above discussion regarding unique identification of playlist content by a URI.

If there are multiple playlists, users are prompted to select one of them. With regard to the "Synchronize" submenu: playlist(s) on the local device is/are synchronized with the ones on server 4080 automatically from time to time (the playlists on the server and the local device(s) may be different since the user modified them from other devices (playlists may be edited from many different devices, which in general, may or may not be devices that consume content listed in the playlists)). The "Synchronize" submenu can be selected by the user to instantly synchronize the playlists on the local device and on the server. The user can also chose to "Synchronize" the playlist contents.

In this example, at step 5010 the user selects the option to "create" a playlist from the main menu. Advancing through the main menu, playlist application 245 instructs processing unit 215 to present a submenu where the user is presented with a choice to create a playlist from a list of content items provide by various sources, for example, an electronic program guide (EPG), search results, recommendations, or shared playlists. At step 5015, the user chooses a content guide source. In this example, the user chooses the EPG as the content guide source to view programming and scheduling information for current and upcoming programming. The EPG programming and scheduling information or data, in this example, is provided by EPG server 4075. After selecting the EPG option, the user is prompted to select a name for the playlist. At step 5020, using the keypad on the remote control and menu, the user enters a name for the playlist, for example Diana1. In this example, the name is stored locally in one or more tables in user memory 210 of set-top terminal 200.

After naming the playlist, the user accesses, for example, the EPG programming and scheduling information from EPG server 4075. As mentioned above, the content items (e.g., programming) of a playlist can be from various sources, such as video 4010 (e.g., live broadcasts) over network 4030, content recorded on local DVRs (e.g. set-top terminal 200) or network DVRs 4070, content from VOD libraries (e.g. video content stores 4060), live IP video 4085, and/or content from online libraries on the internet beyond the service provider offerings (e.g. a video hosting service website).

In one or more embodiments, live content can be obtained, for example, from EPG and search results; VOD content can be obtained, for example, from the VOD catalog and search results; DVR and NDVR content can be obtained, for example, from a suitable Recording Manager program either on the client or in the cloud. Furthermore, external sources can be obtained, for example, from recommendations, social networking, browsing, search, and the like.

In this embodiment of the invention, video content information server 4055 provides information or data related to content items. For example, once an identifier for content is available, for example, in URI form with an ID for a particular domain, the client application can use the content information server to query the meta-data for the content.

Each content item can have associated with it one or more of the following exemplary properties:
Title
LengthInTime
Size
Rating
ShortDescription
Available (yes, no. For contents on content stores, this flag is always set to "yes." For live programming, this flag is set to "no" before the broadcast time, and changed to "yes" when the programming is recorded, or is still being broadcast)
ExpirationDate (expiration date in Coordinated Universal Time (UTC)). When the "Available" flag is set to yes, this value and the available flag are used together to determine if the content is still available.
URL, as seen in FIG. 12. Furthermore in this regard, there can be several ways to build the URI/URL for content. One such scheme is found in the ETV EBIV specification, Enhanced TV Binary Interchange Format, OC-SP-ETV-BIF1.0.1-120614, Cable Television Laboratories, Inc. Jun. 14, 2012, expressly incorporated by reference herein in its entirety for all purposes; in particular, section 11.14 thereof
ID (a unique ID can universally identify the playlist item, i.e. EDIR, or TMS_ID (provided by Tribune Media Services)). The skilled artisan will appreciate that "EIDR" stands for Entertainment Identifier Registry, a universal unique identifier for movie and television assets, similar to ISBN.

The "Title" property represents the title of the content item, while the "ShortDescription" property represents a description of the content item. The "size" property represents the data size of the content item, while the "LengthInTime" property represents the time of the content item. Another property available for a content item is the "Rating" property representing a rating set, for example, by the Motion Picture Association of America (MPAA).

In this example, each content item is associated with an "ID" property, which is a unique ID that identifies the content item and associates the content item with other properties or information, such as the properties mentioned above. Each unique ID is stored in association with its properties or information in one or more tables in video content information server 4055. The unique content item ID can also be used to search availability of content from the EPG and/or content stores 4060 and to obtain a URL for a content item.

After selecting a name for the playlist, the user can select content items to include in the playlist. Using, by way of example and not limitation, the EPG, the user navigates through a list of the content items while selecting content items for playlist "Diana1." The table below is an exemplary playlist "Diana1" having various content items; these are given generic names in the example but it will be appreciated that actual show and network names would typically be used in one or more embodiments:

Example Playlist Diana1

| Type | Schedule | StartDate | Frequency | Program | Service |
|---|---|---|---|---|---|
| Live Event | 4-5 pm | Jul. 20, 2012 | Everyday | News on NW1 | NW1 |
| OnDemand | | Jul. 20, 2012 | | SciFi Sitcom series | NW1 |
| DVR | 7-8 pm | Jul. 20, 2012 | Weekday | Gameshow | NW2 |
| Live Event | 9-10 pm | Jul. 20, 2012 | Wed. | Sitcom | NW1 |
| Live Event | 10-11 pm | Jul. 20, 2012 | Wed. | Police Drama | NW1 |
| Live Event | 10-11 pm | Jul. 20, 2012 | Everyday | NW3 News | NW3 |

At step 5025, the user chooses a content item, for example, News on NW1, for the playlist Diana1. After selecting the content item the user selects a particular schedule, start date and/or frequency at step 5030. For example, using the EPG the user selects News on NW1 as the program or content item, with a frequency of every day (e.g. to play or record) and a start date of 7-20-12 and schedule from 4-5 pm, as shown in the above table. In this example, playlist application 245 instructs processing unit 215 to store in memory 210 the user selected program name, frequency, start date and schedule in one or more tables associated with the playlist Diana1. This information is used by playlist application 245 when instructing processing unit 215 to notify the user of the availability of live content items and when automatically recording live content items, if requested by the user. At step 5035 the content item location and a unique ID associated with the content item are stored in one or more tables associated with the playlist Diana1. In this example, each unique ID is associated with its own content item name, provided, in some cases, by the EPG, and is used to locate and retrieve information or properties that are related to the content item and that are stored in video content information server 4055.

The content item location is provided by, for example, the EPG.

In one or more embodiments, the URL for the content follows the syntax shown in FIG. 13. The protocol can be defined as "tv:", "vod:" or "dvr:" or some other protocol for the future which identifies the mode to access the content. For example, "tv:" indicates live, "vod:" for On Demand, "dvr" for DVR content. The address, patch, identifier can be used for identifying the specific channel/content with the specified access method.

For a live broadcast, the content item location is a channel and for stored or recorded content items the content item location is a content item address and a device address, where the device can be, for example, video content stores 4060, network DVR 4070, or CPE or other device with content item storage capability. The content item address includes, for example, an address of a location of the content item stored in a storage device and the address of the storage device, for example, the address of network DVR 4070. At decision block 5040, a "record" property (can be passed in params) associated with the content item is set to either "yes" or "no". In this example, the user chooses to record the content item, if unavailable to view the content item, and to store it locally on set-top terminal 200. Playlist application 245 instructs processing unit 215 to set the "record" property associated with the content item (e.g. News on NW1) to "yes" and, at step 5045, to store the content item at a location, for example, "thisDevice", which has associated with it a device address, such as the device address of set-top terminal 200.

As soon as a playlist is created/modified/synchronized, new playlist items that are from the live broadcast are scheduled to be recorded if the playlist property "record" is set to "thisDevice," "homeDevices," "server," "allDevices," or "offlinePlay". In at least some embodiments, items that are available on the content stores will only be recorded to local device storage when the "record" flag is set to "offlinePlay." The playlist "Ready" flag changes from "no" to "partial" to "yes" when live broadcast programs are recorded or contents downloaded; the URLs of items may also change in such cases, for example from "tv://channelNumber:startTime" for something not yet broadcast to "dvr://recordId" or to "file://playlist/fileName" for something that has now been recorded.

In some instances, the user is provided a choice to record live content items to various locations or storage devices identified by names, such as the aforementioned "thisDevice," "homeDevices," "server," "allDevices," or "offlinePlay." In this example, "thisDevice" is set-top terminal 200 and "homeDevices" can include set-top terminal 200 and other devices installed in the user's location. The "server" can include network DVR 4070, and "allDevices" can include all devices local and remote to the user's location. The user can also be provided with the option to access that particular show from the VOD library when made available. At decision block 5050, if there are no other content items to be added to the playlist, then playlist application 245 instructs processing unit 215 to timestamp the playlist, at step 5055. The time stamp is a time, day and year the playlist is created or last changed, which is discussed in detail below. If there are more content items to be added to the playlist, then control loops back to step 5025.

If an item is not to be recorded, flow proceeds from decision block 5040 to decision block 5060. Here again, if there are no other content items to be added to the playlist, then playlist application 245 instructs processing unit 215 to timestamp the playlist, at step 5055. The time stamp is a time, day and year the playlist is created or last changed, which is discussed in detail below. If there are more content items to be added to the playlist, then control loops back to step 5025.

A playlist can have following properties:
Name of playlist which is unique to the user
Globally unique which is based on a GUID.
Date created
Ready (yes, no, partial. Are the contents in the playlist ready to be watched?)
Share mode (private, friends, family, group, public)
Genre Priority (priority is used to determine recording/downloading order of playlist items when there are multiple playlists, and when there are not enough recording/downloading resources.

FreeOnly (yes, or no). Does the playlist contain free contents only? If it is set to "no," the user will be prompted with a "consent" window when content is about to be watched, or recorded.

Record (server, thisDevice, homeDevices, allDevices, onlinePlay, none. Whether to record items on playlist to server or local devices).

NumberOfAssets

NumbersReady (numbers of items that are ready to be watched)

Total Length of the playlist in minutes.seconds.

LastPlayedPosition (itemNumber:NPT. Where "NPT" is normal play time. The LastPlayedPosition may change if playlist is modified)

Parental Guidance rating/restrictions

Play Order: Random/Sequential

ListOfItems

With regard to "ListOfItems," in one or more embodiments, an item has following properties: Unique ID, e.g. TMS_ID, or EIDR_ID; source in URL format as seen in FIG. 14; ValidWindow (content valid start time and end time); and Live (flag to indicate if item is live or not).

Referring again to the table shown above, at step 5025 the user selects another content item to include in the playlist Diana1, such as an On Demand content item. In this example, at step 5030, the user selects SciFi Sitcom Series NW1 and selects a particular start date representing a particular episode. For example, using the EPG the user selects SciFi Sitcom Series NW1 as the program or content item, with a frequency of once week and a start date of 7-20-12, as shown above in the aforementioned table. In this case, playlist application 245 instructs processing unit 215 to store in memory 210 the user selected program name and start date in one or more tables associated with the playlist Diana1. At step 5035, the unique ID and content item location is stored in one or more tables associated with the playlist Diana1. The content item location is provided by, for example, the EPG; other approaches could be used in other embodiments. For video on demand, in this example, the content item location is an address within the storage device and the device address of video content stores 4060. All of the On Demand content items in the playlist can be viewed at any time as long as the content is available in the system. At block 5040, a "record" property associated with the content item is set to either "yes" or "no." In this example, the user selected an On Demand content item, so recording the content item is not necessary and the "record" property is set to "no." At block 5060, if there are no other content items to be added to the playlist, then playlist application 245 instructs processing unit 215 to timestamp the playlist, at step 5055. If there are more content items to be added to the playlist, then the logical flow returns to step 5025.

At step 5025, the user selects another content item to include in the playlist Diana1, such as a content item to record. In this example, at step 5030, the user selects Gameshow on NW1 and selects a particular schedule, start date, and frequency. For example, using the EPG the user selects Gameshow on NW1 as the program or content item, with a frequency of weekly and a start date of 7-20-12 scheduled from 4-5 pm, as shown above in the table. In this case, playlist application 245 instructs processing unit 215 to store in memory 210 the user-selected program name, frequency, start date, and schedule in one or more tables associated with the playlist Diana1, which is used to schedule the recording. At step 5035, the unique ID and content item location is stored in the one or more tables associated with the playlist Diana1. In this example, the content item location is a specific content item address and device address of the local DVR in (or connected to) set-top terminal 200. The content item location is provided by, for example, the EPG.

Further entries (e.g. "Sitcom," "Police Drama," and "NW3 News" can proceed in a similar fashion.

As explained above, Playlist application 245 can instruct processing unit 215 to record content items on the playlist for later viewing. At step 5040, a "record" property associated with the content item is set to either "yes" or "no." In this example, the user chooses to record a content item, so the "record" property is set to "yes." Refer to discussion of steps 5040-5060 above.

In a situation where different devices are available, such as video receiver devices, and more live content items have been requested to be recorded than can be recorded on a single storage device (e.g., two content items recorded at the same time), playlist application 245 instructs processing unit 215 to coordinate the recordings using multiple devices, or using network DVR 4070. Playlist application 245 can also instruct processing unit 215 to download content items on the playlist from an online content library, such as video content stores 4060, to local storage, such as set-top terminal 200, during low network usage time.

Synchronization

Generally, after a playlist is created, (e.g., Diana1), a master copy of the playlist is saved on a server in the cloud, for example, user profile/configuration server 4080. Any update or change to the playlist stored on CPE or another device is synchronized with its corresponding master copy playlist stored on user profile/configuration server 4080. As discussed elsewhere, in some instances, the user is afforded the opportunity to play and edit a playlist from any customer premises equipment or other device at any location and any time while being provided with the most current version of the playlist to play or edit. The user can create or edit a playlist on one set-top box or other device, send a copy of the playlist to user profile/configuration server 4080 and later copy the playlist from user profile/configuration server 4080 to another set-top box or other device. Again, in some cases, some devices may be capable of editing the playlist but not consuming the content thereof.

As mentioned above, when a playlist is created or edited it is given a timestamp, which is used to synchronize the playlist among various versions of the playlist stored on various devices. Although a playlist name may be a common name, such as "Diana1," the name includes a unique identifier, such as a service provider account number, to identify the playlist among the many playlists stored in user profile/configuration server 4080. The timestamp is a time, day and year the playlist is created or last changed. After a playlist is created or edited, playlist application 245 instructs processing unit 215 to send a copy of the playlist and its timestamp to user profile/configuration server 4080 where it is stored as a master copy playlist with the timestamp. Every time a playlist is created or changed, a copy of the playlist and timestamp is shared with user profile/configuration server 4080 creating a playlist pair (i.e., a playlist stored on a device and a master copy playlist on server 4080). Every time a master copy playlist is changed its timestamp is updated to the time, date and year of the change.

Figure 9:
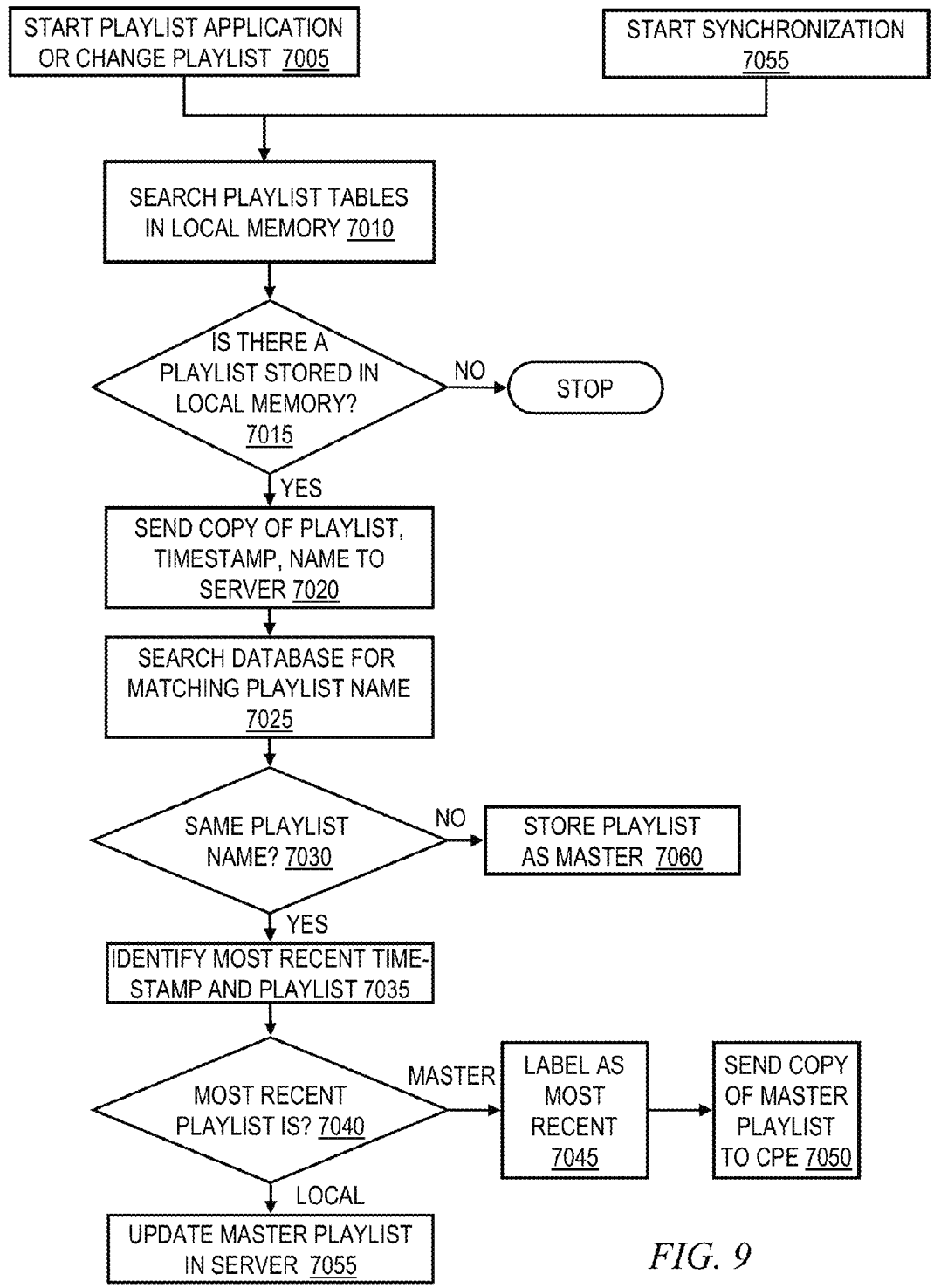
FIG. 9 is a flow chart of exemplary method steps for playlist synchronization, in accordance with an aspect of the invention.

Referring to FIG. 9, at step 7005, playlist application 245 is started or a playlist is changed. The logical flow in FIG.

9 can also be initiated when an automatic or manual synchronization operation is initiated at 7055. At step 7010, playlist application 245 instructs processing unit 215 to search the tables in local memory 210 for one or more playlists. At block 7015, if there is not at least one playlist, then the synchronization process stops. If, at decision block 7015, there is a playlist stored in local memory 210, then at step 7020, playlist application 245 instructs processing unit 215 to communicate to user profile/configuration server 4080 the playlist name and its unique identifier (e.g. account number), playlist (i.e., data) and corresponding timestamp. In response, at step 7025, user profile configuration server 4080 searches its databases for a matching master copy playlist. If, at block 7030, a master copy playlist is not found in user profile/configuration server 4080, (e.g., the playlist stored in local memory 210 is new), then at step 7060 the playlist is stored as the master playlist in user profile/configuration server 4080. If, at block 7030, there is a master copy playlist with a matching name (i.e. playlist pair), then at step 7035, user profile/configuration server 4080 reads the timestamps associated with each playlist of the playlist pair and identifies the most recent timestamp.

The most recent timestamp of the playlist pair represents the most up-to-date version of the playlist, either the playlist stored on the CPE or other device, in this example set-top terminal 200, or the master copy playlist stored on user profile configuration server 4080. At block 7040, if the master copy playlist has the most recent timestamp, then the master copy playlist is considered to be the most recent and up to date playlist, and is labeled as such, at step 7045. Playlist instances on user profile configuration server 4080 and on a local device may be different if the user changes the playlist from another device. At step 7050, if the master copy playlist has the most recent time stamp, user profile configuration server 4080 sends a copy of the most current playlist to set-top terminal 200 where playlist application 245 instructs processing unit 215 to store the most current playlist in local memory 210. At block 7040, if user profile configuration server 4080 determines that the master copy playlist stored on user profile configuration server 4080 does not have the most recent timestamp, then at step 7055 the playlist stored in set-top terminal 200 is considered the most current playlist and the master copy playlist is updated or replaced in user profile/configuration server 4080 to match the playlist stored in set-top terminal 200. In the example discussed above, the playlist Diana1 is a new playlist, so user profile/configuration server 4080 will not have or find a master copy of the playlist Diana1 in its databases and thus saves the playlist Diana1, received from set-top terminal 200, as the master copy.

Periodically, the playlists on local devices are automatically synchronized with the playlists on user profile/configuration server 4080. In this case, without a user starting playlist application 245, creating a new playlist or changing a playlist, playlist application 245 automatically begins the synchronization process described above. The user can also initialize a synchronization of one or more playlists by selecting a "Synchronize" submenu option from the user interface menu to synchronize the playlists on local device with the playlists on the server. See location 7055 as discussed above.

In some cases, in an alternative to creating or modifying a playlist by executing application 245 on set-top terminal 200, a version of playlist application 245 can be located on a server such as user profile/configuration server 4080, and accessed from a remote device via a web browser. In some instances of this kind of arrangement, to access playlist application 245, the user enters a playlist application URL in a web browser running on a device such as computer 4020 or portable device 4015.

Running a Playlist

Figure 8:
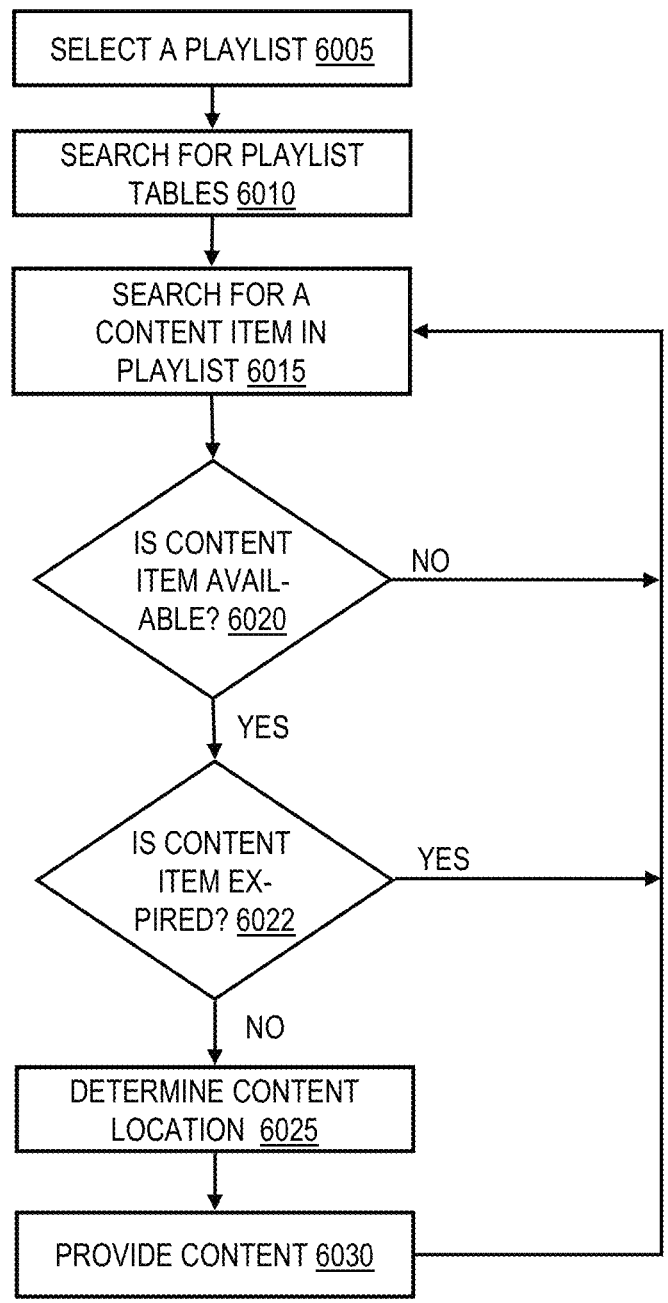
FIG. 8 is a flow chart of exemplary method steps for playing a playlist, in accordance with an aspect of the invention.

Referring to FIG. 8, after one or more playlists are created, at step 6005, a user can select a playlist to view from the main menu. In this example, the user is presented with the option to select playlist Diana1 because only one playlist has been created. After selecting the playlist, at step 6010, playlist application 245 instructs processing unit 215 to search for the one or more tables associated with the playlist Diana1. A user can choose to play a playlist in a predetermined order or a random order and in both cases the content items that are unavailable can be skipped. When unavailable content items become available, they can be placed immediately after the content item currently being viewed in the playlist. In this example, using the user interface, the user chooses to start at the beginning of the playlist. In response, at step 6015, playlist application 245 instructs processing unit 215 to search the one or more tables associated with playlist Diana1 for the first content item in the playlist, which is News on NW1 as shown above in the table. At block 6020, playlist application 245 instructs processing unit 215 to determine if the content is available or unavailable. In this example, playlist application 245 instructs processing unit 215 to request the state of the "available" flag for the unique ID of the content item from video content information server 4055. In response, video content information server 4055 searches its databases for the unique ID and associated information, such as the setting of the "available" flag. Depending on the content item availability, video content information server 4055 sends either a "yes" or "no" to set-top terminal 200. As mentioned above, "availability" flags are always set to "yes" for content items stored on video content stores 4060, network DVR 4070, VOD server 4035, and local DVR 4010. For live content items (e.g., live broadcasts), the "availability" flag is set to "no" before the broadcast time and changes to "yes" during the broadcast time. In this example, at block 6020, video content information server 4055 sends a "yes" to set-top terminal 200 because the content item is a live broadcast that is being aired and thus is available to view. If particular content is not available, logical control returns to step 6015 and a search is made for the next item in the playlist.

At block 6022, playlist application 245 instructs processing unit 215 to determine if the content item is expired or not expired. In this example, playlist application 245 instructs processing unit 215 to request the state of the "ExpirationDate" flag for the unique ID of the content item from video content information server 4055. In response, video content information server 4055 searches its databases for the unique ID and associated information, such as the setting of the "ExpirationDate" flag. Depending on the content item expiration date, video content information server 4055 sends either a "yes" or "no" representing the "ExpirationDate" flag to set-top terminal 200. In this example, the flag is set to "no" indicating that the content is not expired. In this example, the flag is set to "no" because the content item is a live content item that is being aired. If, at block 6022, the "ExpirationDate" flag is set to "yes" then playlist application instructs processing unit 215 to return to step 6015. At step 6025, playlist application 245 instructs processing unit 215 to determine the content item location. Knowing that the content item is available and not expired, playlist application 245 instructs processing unit 215 to determine the content item location from the one or more tables associated with the playlist Diana1. Because the content item is live, the content item location is a channel (e.g., traditional broadcast channel or switched digital video (SDV) channel) and playlist application 245 instructs processing unit 215 to tune set-top terminal 200 to the channel, enabling the user to view the content, at step 6030.

Whether a playlist is running or not, playlist application 245 instructs processing unit 215 to periodically search the tables associated with playlist Diana1 for live content items and trigger a notification to the user that a live content item (e.g., live broadcast) is about to start. If the user does not respond to the notification or is not available to view the live content item, playlist application 245 instructs processing unit 215 to request a recording device to record and store the live content item for later viewing. As mentioned above, in some embodiments, the user is provided a choice to record live content items to various locations or storage devices identified by names, such as "thisDevice," "homeDevices," "server," "allDevices," or "offlinePlay." If the live content item is recorded, playlist application 245 instructs processing unit 215 to store the content item address and device address (e.g., local DVR in set-top terminal 200) in one or more tables associated with the particular content item in playlist Diana1. While the live content item is being recorded, playlist application 245 instructs processing unit 215 to update the "ready" property flag from "no" to "partial" to "yes" while the live content item is recorded or contents downloaded. Playlist application 245 can also instruct processing unit 215 to trigger a confirmation request for the user, in order to save network bandwidth. If the user does not respond to the confirmation request, playlist application 245 instructs processing unit 215 not to tune to the channel (e.g., switched digital video (SDV) channel), thus saving bandwidth. With customer premises equipment that can detect whether a TV screen or display is on or off, playlist application 245 can instruct processing unit 215 to automatically record live content items when the TV screen or display is off.

If the user starts the playlist and the first content item is a live content item that is not available (i.e. broadcast has not yet begun), then playlist application 245 can be set to instruct processing unit 215 to search the one or more tables of the next (or random if play is not sequential) content item in the playlist. In this example, at block 6020, after the user starts the playlist, playlist application 245 determines that the "availability" flag is set to "no" indicating that the content is unavailable. At step 6015, Playlist application 245 instructs processing unit 215 to search the one or more tables associated with playlist Diana1 for the next content item in the playlist. At block 6020, playlist application 245 instructs processing unit 215 to determine if the content is available or unavailable. In this example, playlist application 245 instructs processing unit 215 to request the state of the "available" flag for the unique ID of the content item from video content information server 4055. In response, video content information server 4055 searches its databases for the unique ID and associated information, such as the setting of the "available" flag. Depending on the content item availability, video content information server 4055 sends either a "yes" or "no" representing the "available" flag to set-top terminal 200. In this example, the flag is set to "yes" indicating that the content is available. In this example, the flag is set to "yes" because the content item is a video on demand content item.

At block 6022, playlist application 245 instructs processing unit 215 to determine if the content item is expired or not expired. In this example, playlist application 245 instructs processing unit 215 to request the state of the "Expiration-Date" flag for the unique ID of the content item from video content information server 4055. In response, video content information server 4055 searches its databases for the unique ID and associated information, such as the setting of the "ExpirationDate" flag. Depending on the content item expiration date, video content information server 4055 sends either a "yes" or "no" representing the "ExpirationDate" flag to set-top terminal 200. In this example, the flag is set to "no" indicating that the content is not expired. In this example, the flag is set to "no" because the content item is a video on demand content item that has not expired. If, at block 6022, the "ExpirationDate" flag is set to "yes" then playlist application instructs processing unit 215 to go to step 6015. At step 6025, playlist application 245 instructs processing unit 215 to determine the content item location. Knowing that the content item is available and not expired, playlist application 245 instructs processing unit 215 to determine the content item location from the one or more tables associated with the playlist Diana1. In this example, the device address is that of video content stores 4060 and the content item address is an address of a storage location within video content stores 4060. At step 6030, playlist application 245 instructs processing unit 245 to access the content item for the user to view.

In one or more embodiments, the Playlist can also keep track of the number of views for a particular content item.

After the content item discussed above is viewed, at step 6015, playlist application 245 instructs processing unit 215 to search the tables associated with the playlist Diana1 for the next content item in the playlist, which is SciFi Sitcom Series. In this example, after a content item is provided and viewed, at step 6030, playlist application 245 instructs processing unit 215 to search the tables associated with the playlist Diana1 for the next content item in the playlist, at step 6015. According to the playlist Diana1, shown above in the table above, the content item is a video on demand content item. At step 6015, playlist application 245 instructs processing unit 215 to search the one or more tables associated with playlist Diana for the next content item in the playlist. At block 6020, playlist application 245 instructs processing unit 215 to determine if the content is available or unavailable. In this example, playlist application 245 instructs processing unit 215 to requests the state of the "available" flag for the unique ID of the content item from video content information server 4055. In response, video content information server 4055 searches its databases for the unique ID and associated information, such as the setting of the "available" flag. As mentioned earlier, depending on the content item availability, video content information server 4055 sends either a "yes" or "no" to set-top terminal 200. In this example, the flag is set to "yes" indicating that the content is available because the content item is a video on demand content item.

At block 6022, playlist application 245 instructs processing unit 215 to determine if the content item is expired or not expired. In this example, playlist application 245 instructs processing unit 215 to request the state of the "Expiration-Date" flag for the unique ID of the content item from video content information server 4055. In response, video content information server 4055 searches its databases for the unique ID and associated information, such as the setting of the "ExpirationDate" flag. Depending on the content item expiration date, video content information server 4055 sends either a "yes" or "no" representing the "ExpirationDate" flag to set-top terminal 200. In this example, the flag is set to "no" indicating that the content is not expired. In this example, the flag is set to "no" because the content item is a video on demand content item that has not expired. If, at block 6022, the "ExpirationDate" flag is set to "yes" then playlist application instructs processing unit 215 to go to step 6015.

At step 6025, playlist application 245 instructs processing unit 215 to determine the content item location. Knowing that the content item is available and not expired, playlist application 245 instructs processing unit 215 to determine the content item location from the one or more tables associated with the playlist Diana1. In this example, the device address is that of video content stores 4060 and the content item address is an address of a storage location within video content stores 4060. At step 6030, after determining the content item address and device address (content item location), playlist application 245 instructs processing unit 215 to request the content item from video content stores 4060. Video content stores 4060 searches its databases for the particular content item and establishes a video connection with set-top terminal 200. In one or more embodiments, delivery of the content can be over IP using well-known streaming protocols, or content can be delivered over a QAM transport stream.

After the content item discussed above is viewed, at step 6015, playlist application 245 instructs processing unit 215 to search the tables associated with the playlist Diana1 for the next content item in the playlist, which is Gameshow on NW2. In this non-limiting example, according to the playlist, the content item was recorded and stored locally in DVR of set-top terminal 200 at a particular time and date. At block 6020, playlist application 245 instructs processing unit 215 to determine if the content is available or unavailable. In this example, playlist application 245 instructs processing unit 215 to request the state of the "available" flag for the unique ID of the content item from video content information server 4055. In response, video content information server 4055 searches its databases for the unique ID and associated information, such as the setting of the "available" flag. In this example, the flag is set to "yes" indicating that the content is available because the content item is recorded. At block 6022, playlist application 245 instructs processing unit 215 to determine if the content item is expired or not expired. In this example, playlist application 245 instructs processing unit 215 to request the state of the "ExpirationDate" flag for the unique ID of the content item from video content information server 4055. In response, video content information server 4055 searches its databases for the unique ID and associated information, such as the setting of the "ExpirationDate" flag. Depending on the content item expiration date, video content information server 4055 sends either a "yes" or "no" representing the "ExpirationDate" flag to set-top terminal 200. In this example, the flag is set to "no" indicating that the content is not expired. In this example, the flag is set to "no" because the content item is, as indicated in the table, a local DVR content item that has not expired.

If, at block 6022, the "ExpirationDate" flag is set to "yes," then playlist application instructs processing unit 215 to go to step 6015. At step 6025, playlist application 245 instructs processing unit 215 to determine the content item location. Knowing that the content item is available and not expired, playlist application 245 instructs processing unit 215 to determine the content item location from the one or more records associated with the playlist Diana1. In this example, the device address is that of the local DVR in set-top terminal 200 and the content item address is an address within the local DVR. At step 6030, after determining the content item address and device address (content item location) of the content item, playlist application 245 instructs processing unit 215 to start the DVR and play the content item. Alternatively, if it is determined that the content item in the playlist is located or stored on network DVR 4070, then playlist application 245 instructs processing unit 215 to request the content item at the particular address from network DVR 4070.

If it is determined that a content item is a program from an online content library on the Internet, then playlist application 245 instructs set-top terminal 200 to communicate with content distribution network 4045 requesting the content, enabling the user to view the content. In one or more embodiments, the content can be streamed over an IP network using well-own streaming protocols such as HLS, HSS, DASH, and the like.

Free or paid-for-content can be monitored in a playlist. Playlist application 245 can be set to instruct processing unit 215 to check a playlist for free content. For example, playlist application can search the one or more tables of a playlist and if the entire playlist consists of free content items, playlist application 245 instructs processing unit 215 to set a "FreeOnly" property to "yes." If the playlist does not consist entirely of free content items, playlist application 245 instructs processing unit 215 to set the "FreeOnly" property to "no." If this property is set to "no," the user is prompted with a "consent" window when content is about to be played. If the paid-for-content is to be recorded, the user is prompted with a "consent" window when the user selects the paid-for-content item during the creation or changing of the playlist.

The amount of content items in a playlist can also be monitored. Playlist application 245 can be set to instruct processing unit 215 to check a playlist for the amount of content items. For example, playlist application 245 can instruct processing unit 215 to search the one or more tables of a playlist, count the number of content items, and set the "NumberOfAssets" property to the number of content items in the playlist.

In one or more embodiments, the playlist can also automatically purge items on the list if they are viewed a certain number of times or expired or never viewed, thus allowing automatic clean up and/or management of the playlist.

Playlist application 245 can also monitor of the number of content items available for viewing. For example, when a content item is available or recorded, playlist application 245 instructs processing unit 215 to advance a counter and store the counter value in a "NumbersReady" property. This value is presented to the user by way of the user interface menu.

Another exemplary playlist property is "LastPlayedPosition." This can be stored, for example, as itemNumber:NPT where itemNumber is the item number of the last played content item in the playlist, and "NPT" is the normal play time where the viewing of that item ceased. The LastPlayedPosition may change if the playlist is modified. For example, the LastPlayedPosition can be marked as itemNumber:NPT as well as with title and/or name of the program for cross reference. If the playlist is modified, the itemNumber will be updated as well to point to the same content as last time.

Still another exemplary playlist property is "ListOfItems" as discussed above.

For a playlist that includes live content items as well as OnDemand or DVR content items, playlist application 245 can instruct processing unit 215 to give higher priority to live content items and schedule the OnDemand or DVR content items in any unscheduled timeslots in the playlist.

Further, if the playlist has an empty timeslot, playlist application 245 can instruct processing unit 215 to fill the timeslot with a content item selected from OnDemand or DVR.

As mentioned above, from the menu the user may select different options, such as "edit" an existing playlist, "share" a playlist, "import" a playlist from other users' playlists, or "recommendations" for a playlist. Using the user interface, the user can select the option to "edit" an existing playlist. In response to the user inputs or selections, playlist application 245 instructs processing unit 215 to search in the one or more tables associated with the playlist for content items to delete or, for example, to search the EPG or elsewhere for content items to add to the playlist. The user can also change the order of content items in a playlist. For example, when content items are added to a playlist, playlist application 245 instructs processing unit 215 to store an order number associated with the content item in one or more tables associated with the playlist. When the user changes the order of a content item, playlist application 245 instructs processing unit 215 to rearrange the sequence of the order numbers associated with the content items in the playlist to match then new order.

Other options in the menu may include an option to "share" a playlist with one or more friends. In response to the user's inputs and/or selections, playlist application 245 instructs processing unit 215 to set the "share" property of the playlist to, for example, one of private, friends, family, group, and public. In the case of sharing the playlist with a friend, the "share" property is set to "friends" and the user may grant the friend permission to read a playlist "in the cloud," or may send a user a link to a playlist. The friend can then "import" the playlist from user profile/configuration server 4080. Alternatively, user may simply email the playlist to a friend.

Based on the user preference, playlist application 245 can instruct processing unit 215 to prioritize the live content items over OnDemand content items and rearrange the sequence as necessary. For a playlist that only includes live content items, if there are any schedule gaps between live content items on the playlist, playlist application 245 can instruct processing unit 215 to select content items for the user based on user preference, recommendations from other live content items, or any other content on the DVR/OnDemand service. The selection of content items in a playlist can be dynamic; for example, via a recommendation engine that bases its recommendations on viewing behavior, preferences, or user inputs. For example, in the case of viewing behavior, the recommendation engine can base a recommended playlist or content items on a user's favorite channels and/or programs at preferred schedules. Over time, playlist application 245 can instruct processing unit 215 to track content items watched by the user and, for example, not play or recommend some of the previously viewed content items for a configurable time period. The consumption data can also be useful metrics for targeted advertising campaigns.

In another aspect, given an EEG device, such as the NeuroSky MindSet, a person's brainwave pattern can be scanned (for example, while he or she watches TV), and depending on different brainwave patterns, a playlist can be created or content recommended based on the user's interests over time and/or current mental state or desired future mental state. In some cases, this can be accomplished without any conscious interaction with the system. Of course, such a feature is only implemented with informed consent of the user, who voluntarily wears the required headset.

By way of example, using a brain-to-computer interface, brainwaves associated with the enjoyment of watching certain content items can lead to such content being added to a playlist. In another aspect, an existing playlist can be recommended or selected based on current brain activity and possibly also based on a desired state or mood that it is desired to achieve. For example, a user in a relaxed state may desire to enter a more energetic state to facilitate a physical workout. A gradual warm-up playlist may initially be selected and when the brainwave activity indicates that the brain is "ready to go" a "hard rock" playlist may be selected to motivate the user to energetically exercise. In another example, detection of brainwaves consistent with an agitated user may result in selection of a soothing playlist of nature or gardening videos to allow the person to relax. Thus, in one or more embodiments, the behavior of the user is not monitored; rather, detection of the user's brainwave patterns allow inferences about his or her mental state with concomitant action such a selecting a playlist to complement or alter such state or to select an item for a playlist based on its effect on the user's brainwave patterns.

Furthermore in this regard, in some instances, a suitable application 1401 can be downloaded to a device 1403 such as mobile phone or other portable device 4015, IP STB 4005, computer 4020, or STB 200 or 4025. The device (see 200, 1000) on which the application runs interfaces with a brainwave-reading headset 1405 such as those available from NeuroSky, Inc., San Jose, Calif., USA, via a suitable application program interface 1407 and a wired or wireless communications interface (e.g., Bluetooth 1409). The application monitors the brainwaves to obtain an indication of the user's current activity level and/or mental state. For example, a Delta brainwave of 0.1 Hz to 3 Hz may be associated with deep, dreamless sleep, non-REM sleep, or unconsciousness; a Theta brainwave of 4 Hz to 7 Hz may be associated with intuitive, creative, recall, fantasy, imaginary, and/or dream activities; an Alpha brainwave of 8 Hz to 12 Hz may be associated with relaxed, but not drowsy, tranquil, conscious state(s); a Low Beta brainwave of 12 Hz to 15 Hz may be associated with a relaxed yet focused, integrated state; a Midrange Beta of 16 Hz to 20 Hz may be associated with a thinking, aware of self & surroundings state; a High Beta brainwave of 21 Hz to 30 Hz may be associated with alertness and/or agitation; and a Gamma brainwave of 30 Hz to 100 Hz may be associated with motor functions and/or higher mental activity.

An agitated user may want to be relaxed and so may seek to obtain an Alpha or Low Beta pattern. Logic in application 1401 may initially activate a playlist or program to achieve a mid-range Beta state to get the user's focus off of agitating thoughts, and then may seek to obtain a Low Beta state via a playlist with suitable content such as gardening or the like; material that can be viewed and enjoyed without significant cognitive demands. Then, it may be desirable to activate a further playlist to attain an Alpha state, with even more relaxing content.

Application 1401 may operate on raw data (e.g., sensed brainwave frequency) or may receive an indication of mental state based on the sensed brainwaves. Application 1401, as noted, includes logic to select existing playlist(s) and/or recommend additions to a new or existing playlist based on sensed brainwaves.

While a content item in a playlist is running, a user can bookmark any point in the content item and can access the bookmark later to continue playing the playlist from the bookmark point. A user can pause the playlist and continue to play from the paused point. Live content items can be paused using a time-shifted buffer in any device which consumes assets on the playlist. If, for example, a live content item is paused for period that is longer than the time shifted buffer can support, and if a DVR is available either on the receiver or the network, the live content item is recorded. A bookmark is automatically created when a viewing session of a playlist is terminated, so the user can resume viewing the playlist at a later time from the point of termination. The user can fast forward, rewind, forward skip, and/or reverse skip to a scene in a content item. A playlist can be configured to allow/disallow fast forward/review/skip functions based on content item metadata. The user can start to view a content item from any previously bookmarked point and/or the beginning of any content contained in the playlist, and can also search for a scene/marker in all the content items in a playlist. A search can be based on text search, for example, searching on the text contained in closed caption embedded in the video content, and/or on a local or remote database that contains metadata that is synchronized/mapped to scenes in video content. The search can also be based on ACR (Automated Content Recognition) technology. The user can optionally stop the playlist and return to the main menu. At the end of the playlist, the application returns to the main menu.

Thus, one or more embodiments are not limited to playlists in the cable/MSO VOD environment, wherein all the playlist assets are from VOD system. On the contrary, one or more embodiments are capable of creating a playlist with items from live broadcast on RF and IP, in home DVR(s), NDVR, home PC and portable devices, and contents in the private network and/or public network (Internet, such as video-sharing web sites and the like). In one or more embodiments, the playlist application also coordinates the sharing of resources, so that the items on the playlist can be recorded/downloaded onto difference devices and later the recorded contents can be shared/watched on the same or other devices (as the one recorded on). One or more embodiments of a playlist application also have a client/server feature, in that the playlist can be created/edited either on the server, or on the local devices, and then synchronized with ones on the server.

Given the discussion thus far, it will be appreciated that, in general terms, an exemplary method, according to an aspect of the invention, includes the step of providing a playlist server application on a server (in some instances, a playlist server; server 4080 is a non-limiting example) at a first network node (e.g., head end, data center, or other node remote from the CPE or other devices). An additional step includes providing a playlist local application for a remote device (e.g., one or more of elements 4025, 200, 4020, 4005, 4015). Application 245 is a non-limiting example. A still further step is obtaining an indication of a change (e.g., initial construction of the playlist or editing a pre-existing playlist) to a playlist on one of the server and the remote device from a corresponding one of the playlist server application and the playlist local application. This step can be carried out, for example, by obtaining user input to the corresponding application. See, e.g., discussion of FIG. 7. An even further step includes synchronizing the change to another one of the server and the remote device (i.e., to the server if change via playlist local app and to the local device if change via playlist server app). See, e.g., discussion of FIG. 9.

In some instances, a further step includes constructing the playlist by designating at least one content item from each of a multi-service operator system and a location outside the multi-service operator system.

The at least one content item from the multi-service operator system could be obtained, for example, from any one, some, or all of a video-on-demand server 4035, a live broadcast channel 4010; a local digital video reorder (e.g., part of or connected to box 200); or a network digital video recorder 4070. "Live" in this context means currently being broadcast and may or may not refer to a "live" event such as a sports event.

The at least one content item from the location outside the multi-service operator system could be obtained, for example, from any one, some, or all of a live internet protocol television channel 4085, a desktop computing device 4020 having an internet protocol network connection; a portable computing device 4015 having an internet protocol network connection; or a video-sharing web site accessible over an internet protocol network connection (e.g., one or more servers such as 1000 connected to the Internet). Again, "live" in this context means currently being broadcast and may or may not refer to a "live" event such as a sports event.

In some instances, a still further step includes playing the playlist including the at least one content item from the multi-service operator system and the at least one content item from the location outside the multi-service operator system at a given device. See, e.g., FIG. 8.

In some cases, in the playing step, the given device is the remote device, and the remote device is capable of consuming the playlist content.

In some cases, an additional step includes obtaining from a user a search query for at least one of a scene and a marker; and carrying out a search for the at least one of a scene and a marker across all of the content items in the playlist (non-limiting exemplary search techniques include text searching in a closed caption, searching in metadata associated with one or more of the content items, and searching via automated content recognition). Again, see, e.g., discussion of FIG. 8 and accompanying text.

In another aspect, an exemplary method includes the step of providing a playlist server application on a server (in some instances, a playlist server; server 4080 is a non-limiting example) at a first network node (e.g., head end, data center, or other node remote from the CPE or other devices). A further step includes constructing a playlist via the playlist server application. The playlist in turn includes at least one content item from each of a multi-service operator system; and a location outside the multi-service operator system.

The at least one content item from the multi-service operator system could be obtained, for example, from any one, some, or all of a video-on-demand server 4035, a live broadcast channel 4010; a local digital video reorder (e.g., part of or connected to box 200); or a network digital video recorder 4070. "Live" in this context means currently being broadcast and may or may not refer to a "live" event such as a sports event.

The at least one content item from the location outside the multi-service operator system could be obtained, for example, from any one, some, or all of a live internet protocol television channel 4085, a desktop computing device 4020 having an internet protocol network connection; a portable computing device 4015 having an internet protocol network connection; or a video-sharing web site accessible over an internet protocol network connection (e.g., one or more servers such as 1000 connected to the Internet). Again, "live" in this context means currently being broadcast and may or may not refer to a "live" event such as a sports event.

Any of the methods can be carried out, at least in part, with one or more distinct software modules embodied on a non-transitory tangible computer-readable recordable storage medium, executing on one or more hardware processors, and can also include the additional step of providing a system including the modules and optionally the at least one processor. For example, the modules can include a playlist server application and/or a playlist local application with code to implement the corresponding logic in the flow charts.

In another aspect, an exemplary server (in some instances, a playlist server; server 4080 is a non-limiting example) for interfacing with a remote device (e.g., one or more of elements 4025, 200, 4020, 4005, 4015). The server includes at least one hardware processor 1020, at least one memory 1030 coupled to the at least one hardware processor, and a playlist server application software module, embodied on a non-transitory tangible computer-readable recordable storage medium. The playlist server application software module, when loaded into the memory, causes the at least one hardware processor to obtain an indication of a change to a playlist on one of the server and the remote device; and synchronize the change to another one of the server and the remote device. Refer to discussion of the method(s) above.

In some cases, the playlist server application software module, when loaded into the memory, further causes the at least one hardware processor to construct the playlist by designating at least one content item from each of: a multi-service operator system; and a location outside the multi-service operator system. Again, refer to discussion of the method(s) above.

In still another aspect, an exemplary apparatus (e.g., server (in some instances, a playlist server; server 4080 is a non-limiting example) or remote device such as 200, 4005, 4015, 4020, 4025, 4030) includes at least one hardware processor 1020, at least one memory 1030 coupled to the at least one hardware processor, and a playlist application software module, embodied on a non-transitory tangible computer-readable recordable storage medium (e.g., playlist server application software module or playlist local application software module as the case may be). The playlist application software module, when loaded into the memory, causes the at least one hardware processor to construct a playlist which comprises at least one content item from each of: a multi-service operator system; and a location outside the multi-service operator system. Once again, refer to discussion of the method(s) above.

In a further aspect, a remote device (e.g., 200, 4005, 4015, 4020, 4025, 4030) for interfacing with a server (in some instances, a playlist server; server 4080 is a non-limiting example) includes at least one hardware processor 215, 1020, at least one memory 210, 1030 coupled to the at least one hardware processor; and a playlist local application software module (245 is a non-limiting example), embodied on a non-transitory tangible computer-readable recordable storage medium. The playlist local application software module, when loaded into the memory, causes the at least one hardware processor to: obtain an indication of a change to a playlist on one of the server and the remote device; and synchronize the change to another one of the server and the remote device. In some cases, the playlist local application software module, when loaded into the memory, further causes the at least one hardware processor to construct the playlist by designating at least one content item from each of: a multi-service operator system; and a location outside the multi-service operator system.

Figure 15:
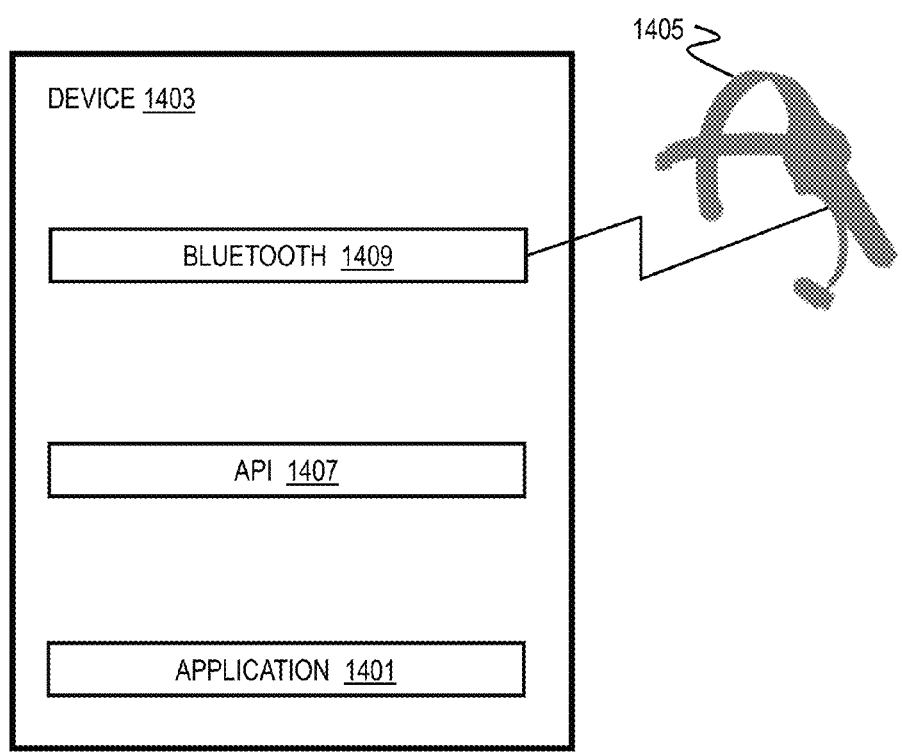
FIG. 15 shows an exemplary remote device interfacing with a brainwave sensor headset, in accordance with an aspect of the invention.

In still a further aspect, referring to FIG. 15, an exemplary method includes the step of obtaining, at a computing device 1403, input from a brainwave sensor 1405 indicative of brainwaves of a user. Device 1403 could be a remote device (e.g., 200, 4005, 4015, 4020, 4025, 4030) or could even be a server (in some instances, a playlist server; server 4080 is a non-limiting example) that obtains input indirectly, over a network, from a remote device. See. e.g., FIGS. 6 and 10. A further step includes, based at least in part on the input from the brainwave sensor, carrying out, by a processor of the device executing an application program 1401, at least one of: (1) recommendation of a currently playing item, which has, at least in part, influenced the brainwaves, for inclusion in a first playlist; and (2) recommendation of a second playlist to at least one of complement and alter a mental state of the user (the mental state of the user is associated with the brainwaves of the user as explained above). A further step includes adding the currently playing item to the first playlist and/or playing the second playlist in accordance with the carrying out step.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included. The means do not include a transmission medium per se or a disembodied signal per se.

Figure 10:
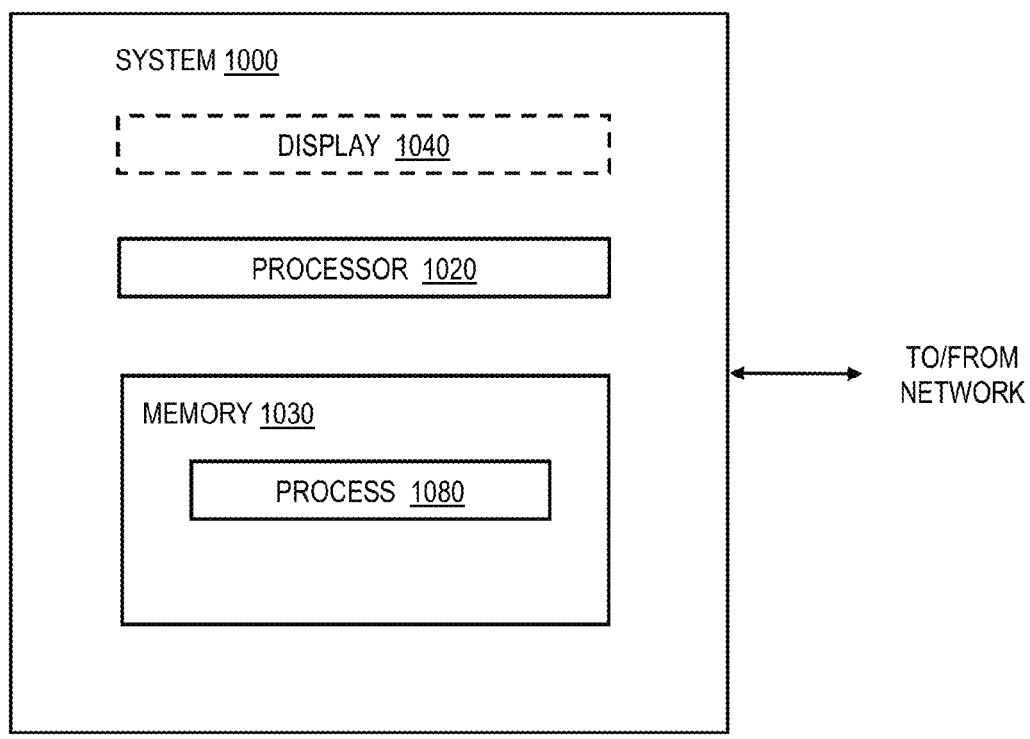
FIG. 10 is a block diagram of a computer system useful in connection with one or more aspects of the invention.

FIG. 10 is a block diagram of a system 1000 that can implement at least some aspects of the invention, and is representative, for example, of the servers, computers, mobile devices, and the like shown in the figures. The processor, memory, and process are also representative of aspects of the functionality of set-top terminals, and the like. As shown in FIG. 10, memory 1030 configures the processor 1020 to implement one or more methods, steps, and functions (collectively, shown as process 1080 in FIG. 10) described herein. The memory 1030 could be distributed or local and the processor 1020 could be distributed or singular. Different steps could be carried out by different processors.

The memory 1030 could be implemented as an electrical, magnetic or optical memory, or any combination of these or other types of storage devices. It should be noted that if distributed processors are employed, each distributed processor that makes up processor 1020 generally contains its own addressable memory space. It should also be noted that some or all of computer system 1000 can be incorporated into an application-specific or general-use integrated circuit. For example, one or more method steps could be implemented in hardware in an ASIC rather than using firmware. Display 1040 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1000 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include one or more computer programs comprising computer program code means adapted to perform one or all of the steps of any methods or claims set forth herein when such program is run, for example, on the server 4080, set-top terminal 200, 4025, or 4005; computer/device 4015/4020; or the like, and that such program may be embodied on a tangible computer readable recordable storage medium. As used herein, including the claims, a "server" includes a physical data processing system (for example, system 1000 as shown in FIG. 10) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include, for example, a playlist server application and a playlist local application; in general, any or all of the components shown in the figures and/or described herein. The method steps can then be carried out using the distinct software modules of the system, as described above, executing on one or more hardware processors (e.g., a processor or processors in a server 4080, set-top terminal 200, 4025, or 4005; computer/device 4015/4020; processor 1020; and the like). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
providing a playlist server application at a first network node on at least one server;
persisting a playlist on said at least one server, wherein said playlist on said at least one server is a master copy playlist;
providing a playlist local application for a remote device;
obtaining, by said playlist server application, an indication of a change to said playlist from one of said playlist server application and said playlist local application, said indication of change comprising a designation of at least one content item from a location outside a multi-service operator system;
identifying a most current version of said playlist at one of said at least one server and said remote device, wherein said most current version of said playlist includes said change; and
synchronizing said change to one of said master copy playlist on said at least one server and a local copy of said playlist stored on said remote device.

2. The method of claim 1, further comprising constructing said playlist by designating at least one content item available over a video content network of said multi-service operator system from each of:
said multi-service operator system; and
said location outside said multi-service operator system.

3. The method of claim 2, wherein, in said constructing step:
said at least one content item from said multi-service operator system is obtained from at least one of:
a video-on-demand server;
a live broadcast channel;
a local digital video reorder; and
a network digital video recorder; and
said at least one content item from said location outside said multi-service operator system is obtained from at least one of:
a live internet protocol television channel;
a desktop computing device having an internet protocol network connection;
a portable computing device having an internet protocol network connection; and
a video-sharing web site accessible over an internet protocol network connection.

4. The method of claim 2, wherein, in said constructing step:
said at least one content item from said multi-service operator system comprises:
at least one content item obtained from a video-on-demand server;
at least one content item obtained from a live broadcast channel;
at least one content item obtained from a local digital video reorder; and
at least one content item obtained from a network digital video recorder; and
said at least one content item from said location outside said multi-service operator system is obtained from at least one of:
at least one content item obtained from a live internet protocol television channel;
at least one content item obtained from a desktop computing device having an internet protocol network connection;
at least one content item obtained from a portable computing device having an internet protocol network connection; and
at least one content item obtained from a video-sharing web site accessible over an internet protocol network connection.

5. The method of claim 2, further comprising playing said playlist including said at least one content item from said multi-service operator system and said at least one content item from said location outside said multi-service operator system at a given device.

6. The method of claim 5, wherein, in said playing step, said given device comprises said remote device, said remote device being capable of consuming said playlist content.

7. The method of claim 2, further comprising:
obtaining from a user a search query for at least one of a scene and a marker; and
carrying out a search for said at least one of a scene and a marker across all of said content items in said playlist.

8. The method of claim 7, wherein said carrying out of said search comprises at least one of text searching in a closed caption, searching in metadata associated with one or more of said content items, and searching via automated content recognition.

9. The method of claim 1, wherein said making of said change comprises initial construction of said playlist.

10. The method of claim 1, wherein said synchronizing of said change comprises editing said playlist, said playlist being pre-existing, and wherein said playlist is one copy among multiple copies comprising said master copy playlist persistently stored at a user profile/configuration server and said local copy of playlist stored at said remote device, wherein each of said multiple copies of said playlist is timestamped, and wherein said synchronization of said change uses said most current version of said playlist having a latest timestamp among said multiple copies to update remaining ones of said multiple copies of said playlist.

11. A server for interfacing with a remote device, said server comprising:
at least one hardware processor;
at least one memory coupled to said at least one hardware processor and storing a master copy of a playlist persistently; and
a playlist server application software module, embodied on a non-transitory tangible computer-readable recordable storage medium;
wherein:
said playlist server application software module, when loaded into said memory, causes said at least one hardware processor to:
obtain, from said remote device, an indication of a change to a version of said playlist stored at said remote device, said indication of change comprising a designation of at least one content item from a location outside a multi-service operator system; and
synchronize said change to said master copy of said playlist stored in said at least one memory of said server.

12. The server of claim 11, wherein said playlist server application software module, when loaded into said memory, further causes said at least one hardware processor to construct said playlist upon obtaining said designation of said at least one content item from each of:
said multi-service operator system; and
said location outside said multi-service operator system.

13. The server of claim 12, wherein said playlist server application software module, when loaded into said memory, further causes said at least one hardware processor to:
obtain said at least one content item from said multi-service operator system from at least one of:
a video-on-demand server;
a live broadcast channel;
a local digital video reorder; and
a network digital video recorder; and
obtain said at least one content item from said location outside said multi-service operator system from at least one of:
a live internet protocol television channel;
a desktop computing device having an internet protocol network connection;
a portable computing device having an internet protocol network connection; and
a video-sharing web site accessible over an internet protocol network connection.

14. The server of claim 12, wherein said playlist server application software module, when loaded into said memory, further causes said at least one hardware processor to:
obtain said at least one content item from said multi-service operator system as:
at least one content item obtained from a video-on-demand server;
at least one content item obtained from a live broadcast channel;

at least one content item obtained from a local digital video reorder; and at least one content item obtained from a network digital video recorder; and obtain said at least one content item from said location outside said multi-service operator system as:

at least one content item obtained from a live internet protocol television channel;

at least one content item obtained from a desktop computing device having an internet protocol network connection;

at least one content item obtained from a portable computing device having an internet protocol network connection; and at least one content item obtained from a video-sharing web site accessible over an internet protocol network connection.

15. A remote device for interfacing with a server, said remote device comprising:

at least one hardware processor;

at least one memory coupled to said at least one hardware processor; and a playlist local application software module, embodied on a non-transitory tangible computer-readable recordable storage medium; wherein:

said playlist local application software module, when loaded into said memory, causes said at least one hardware processor to:

obtain, from said server, an indication of a change to a master copy of a playlist stored at said server, said indication of change comprising a designation of at least one content item from a location outside a multi-service operator system; and synchronize said change to a version of said playlist stored in said at least one memory of said remote device.

16. The remote device of claim 15, wherein said playlist local application software module, when loaded into said memory, further causes said at least one hardware processor to construct said playlist using said designation of said at least one content item from each of:

said multi-service operator system; and said location outside said multi-service operator system.

* * * * *